(12) United States Patent
Chui et al.

(10) Patent No.: US 12,236,597 B2
(45) Date of Patent: Feb. 25, 2025

(54) SYSTEMS AND METHODS FOR CORRELATING OBJECTS OF INTEREST

(71) Applicant: Hologic, Inc., Marlborough, MA (US)

(72) Inventors: Haili Chui, Fremont, CA (US); Ashwini Kshirsagar, Cupertino, CA (US); Xiangwei Zhang, Fremont, CA (US)

(73) Assignee: Hologic, Inc., Marlborough, MA (US)

( * ) Notice: Subject to any disclaimer, the term of this patent is extended or adjusted under 35 U.S.C. 154(b) by 0 days.

(21) Appl. No.: 18/671,250

(22) Filed: May 22, 2024

(65) Prior Publication Data

US 2024/0320827 A1 Sep. 26, 2024

Related U.S. Application Data

(63) Continuation of application No. PCT/US2022/080432, filed on Nov. 23, 2022.

(60) Provisional application No. 63/283,866, filed on Nov. 29, 2021.

(51) Int. Cl.
 *G06T 7/00* (2017.01)
 *G06T 7/11* (2017.01)
(52) U.S. Cl.
 CPC ............ *G06T 7/0012* (2013.01); *G06T 7/11* (2017.01); *G06T 2207/20081* (2013.01); *G06T 2207/30068* (2013.01); *G06T 2207/30096* (2013.01)
(58) Field of Classification Search
 None
 See application file for complete search history.

(56) References Cited

U.S. PATENT DOCUMENTS

| | | |
|---|---|---|
| 3,502,878 A | 3/1970 | Stewart |
| 3,863,073 A | 1/1975 | Wagner |

(Continued)

FOREIGN PATENT DOCUMENTS

| | | |
|---|---|---|
| AU | 2014339982 | 4/2015 |
| CN | 1802121 A | 7/2006 |

(Continued)

OTHER PUBLICATIONS

Perek, S. et al. "Siamese network for dual-view mammography mass matching." Image Analysis for Moving Organ, Breast &Thoracic Images: 3rd Int'l Workshop, Rambo 2018, 4th Int'l Workshop, BIA 2018, and 1st Int'l Workshop, TIA 2018, Proceedings 3. Springer International Publishing, 2018. (Year: 2018).*

(Continued)

*Primary Examiner* — Samah A Beg
(74) *Attorney, Agent, or Firm* — Merchant & Gould P.C.

(57) ABSTRACT

A method of correlating regions in an image pair including a cranial-caudal image and a medial-lateral-oblique image. Data from a similarity matching model is received by an ensemble model, the data including at least a matched pair of regions and a first confidence level indicator associated with the matched pair of regions. Data from a geo-matching model is received by the ensemble model, the data from the geo-matching model including at least the matched pair of regions and a second confidence level indicator. A joint probability of correlation is determined by the ensemble model based on evaluation of each of the first and second confidence level by the ensemble matching model, wherein the joint probability of correlation provides a probability that the region in each image correlates to the corresponding region in the other image. The joint probability of correlation is provided to an output device.

23 Claims, 14 Drawing Sheets

(56) References Cited

U.S. PATENT DOCUMENTS

| | | |
|---|---|---|
| 3,971,950 A | 7/1976 | Evans et al. |
| 4,160,906 A | 7/1979 | Daniels |
| 4,310,766 A | 1/1982 | Finkenzeller et al. |
| 4,496,557 A | 1/1985 | Malen et al. |
| 4,559,557 A | 12/1985 | Keyes |
| 4,559,641 A | 12/1985 | Caugant et al. |
| 4,706,269 A | 11/1987 | Reina et al. |
| 4,727,565 A | 2/1988 | Ericson |
| 4,744,099 A | 5/1988 | Huettenrauch |
| 4,773,086 A | 9/1988 | Fujita |
| 4,773,087 A | 9/1988 | Plewes |
| 4,819,258 A | 4/1989 | Kleinman et al. |
| 4,821,727 A | 4/1989 | Levene et al. |
| 4,907,156 A | 6/1990 | Doi et al. |
| 4,969,174 A | 11/1990 | Schied |
| 4,989,227 A | 1/1991 | Tirelli et al. |
| 5,018,176 A | 5/1991 | Romeas et al. |
| RE33,634 E | 7/1991 | Yanaki |
| 5,029,193 A | 7/1991 | Saffer |
| 5,051,904 A | 9/1991 | Griffith |
| 5,078,142 A | 1/1992 | Siczek et al. |
| 5,099,846 A | 3/1992 | Hardy |
| 5,129,911 A | 7/1992 | Siczek et al. |
| 5,133,020 A | 7/1992 | Giger et al. |
| 5,163,075 A | 11/1992 | Lubinsky |
| 5,164,976 A | 11/1992 | Scheid et al. |
| 5,199,056 A | 3/1993 | Darrah |
| 5,219,351 A | 6/1993 | Teubner |
| 5,240,011 A | 8/1993 | Assa |
| 5,279,309 A | 1/1994 | Taylor et al. |
| 5,280,427 A | 1/1994 | Magnusson |
| 5,289,520 A | 2/1994 | Pellegrino et al. |
| 5,343,390 A | 8/1994 | Doi et al. |
| 5,359,637 A | 10/1994 | Webbe |
| 5,365,562 A | 11/1994 | Toker |
| 5,386,447 A | 1/1995 | Siczek |
| 5,415,169 A | 5/1995 | Siczek et al. |
| 5,426,685 A | 6/1995 | Pellegrino et al. |
| 5,452,367 A | 9/1995 | Bick |
| 5,491,627 A | 2/1996 | Zhang et al. |
| 5,499,097 A | 3/1996 | Ortyn et al. |
| 5,506,877 A | 4/1996 | Niklason et al. |
| 5,526,394 A | 6/1996 | Siczek |
| 5,539,797 A | 7/1996 | Heidsieck et al. |
| 5,553,111 A | 9/1996 | Moore |
| 5,592,562 A | 1/1997 | Rooks |
| 5,594,769 A | 1/1997 | Pellegrino et al. |
| 5,596,200 A | 1/1997 | Sharma |
| 5,598,454 A | 1/1997 | Franetzki |
| 5,609,152 A | 3/1997 | Pellegrino et al. |
| 5,627,869 A | 5/1997 | Andrew et al. |
| 5,642,433 A | 6/1997 | Lee et al. |
| 5,642,441 A | 6/1997 | Riley et al. |
| 5,647,025 A | 7/1997 | Frost et al. |
| 5,657,362 A | 8/1997 | Giger et al. |
| 5,660,185 A | 8/1997 | Shmulewitz et al. |
| 5,668,889 A | 9/1997 | Hara |
| 5,671,288 A | 9/1997 | Wilhelm et al. |
| 5,709,206 A | 1/1998 | Teboul |
| 5,712,890 A | 1/1998 | Spivey |
| 5,719,952 A | 2/1998 | Rooks |
| 5,735,264 A | 4/1998 | Siczek et al. |
| 5,757,880 A | 5/1998 | Colomb |
| 5,763,871 A | 6/1998 | Ortyn et al. |
| 5,769,086 A | 6/1998 | Ritchart et al. |
| 5,773,832 A | 6/1998 | Sayed et al. |
| 5,803,912 A | 9/1998 | Siczek et al. |
| 5,818,898 A | 10/1998 | Tsukamoto et al. |
| 5,828,722 A | 10/1998 | Ploetz |
| 5,835,079 A | 11/1998 | Shieh |
| 5,841,124 A | 11/1998 | Ortyn et al. |
| 5,872,828 A | 2/1999 | Niklason et al. |
| 5,875,258 A | 2/1999 | Ortyn et al. |
| 5,878,104 A | 3/1999 | Ploetz |
| 5,878,746 A | 3/1999 | Lemelson et al. |
| 5,896,437 A | 4/1999 | Ploetz |
| 5,941,832 A | 8/1999 | Tumey |
| 5,954,650 A | 9/1999 | Saito |
| 5,986,662 A | 11/1999 | Argiro |
| 6,005,907 A | 12/1999 | Ploetz |
| 6,022,325 A | 2/2000 | Siczek et al. |
| 6,067,079 A | 5/2000 | Shieh |
| 6,075,879 A | 6/2000 | Roehrig et al. |
| 6,091,841 A | 7/2000 | Rogers |
| 6,091,981 A | 7/2000 | Cundari et al. |
| 6,101,236 A | 8/2000 | Wang et al. |
| 6,102,866 A | 8/2000 | Nields et al. |
| 6,137,527 A | 10/2000 | Abdel-Malek |
| 6,141,398 A | 10/2000 | He |
| 6,149,301 A | 11/2000 | Kautzer et al. |
| 6,175,117 B1 | 1/2001 | Komardin |
| 6,196,715 B1 | 3/2001 | Nambu |
| 6,215,892 B1 | 4/2001 | Douglass et al. |
| 6,216,540 B1 | 4/2001 | Nelson |
| 6,219,059 B1 | 4/2001 | Argiro |
| 6,256,370 B1 | 4/2001 | Yavus |
| 6,233,473 B1 | 5/2001 | Sheperd |
| 6,243,441 B1 | 6/2001 | Zur |
| 6,245,028 B1 | 6/2001 | Furst et al. |
| 6,272,207 B1 | 8/2001 | Tang |
| 6,289,235 B1 | 9/2001 | Webber et al. |
| 6,292,530 B1 | 9/2001 | Yavus |
| 6,293,282 B1 | 9/2001 | Lemelson |
| 6,327,336 B1 | 12/2001 | Gingold et al. |
| 6,327,377 B1 | 12/2001 | Rutenberg et al. |
| 6,341,156 B1 | 1/2002 | Baetz |
| 6,375,352 B1 | 4/2002 | Hewes |
| 6,389,104 B1 | 5/2002 | Bani-Hashemi et al. |
| 6,411,836 B1 | 6/2002 | Patel |
| 6,415,015 B2 | 7/2002 | Nicolas |
| 6,424,332 B1 | 7/2002 | Powell |
| 6,442,288 B1 | 8/2002 | Haerer |
| 6,459,925 B1 | 10/2002 | Nields et al. |
| 6,463,181 B2 | 10/2002 | Duarte |
| 6,468,226 B1 | 10/2002 | McIntyre, IV |
| 6,480,565 B1 | 11/2002 | Ning |
| 6,501,819 B2 | 12/2002 | Unger et al. |
| 6,556,655 B1 | 4/2003 | Chichereau |
| 6,574,304 B1 | 6/2003 | Hsieh |
| 6,597,762 B1 | 7/2003 | Ferrant |
| 6,611,575 B1 | 8/2003 | Alyassin et al. |
| 6,620,111 B2 | 9/2003 | Stephens et al. |
| 6,626,849 B2 | 9/2003 | Huitema et al. |
| 6,633,674 B1 | 10/2003 | Barnes |
| 6,638,235 B2 | 10/2003 | Miller et al. |
| 6,647,092 B2 | 11/2003 | Eberhard |
| 6,650,928 B1 | 11/2003 | Gailly |
| 6,683,934 B1 | 1/2004 | Zhao |
| 6,744,848 B2 | 6/2004 | Stanton |
| 6,748,044 B2 | 6/2004 | Sabol et al. |
| 6,751,285 B2 | 6/2004 | Eberhard |
| 6,758,824 B1 | 7/2004 | Miller et al. |
| 6,813,334 B2 | 11/2004 | Koppe |
| 6,882,700 B2 | 4/2005 | Wang |
| 6,885,724 B2 | 4/2005 | Li |
| 6,901,156 B2 | 5/2005 | Giger et al. |
| 6,912,319 B1 | 5/2005 | Barnes |
| 6,940,943 B2 | 9/2005 | Claus |
| 6,978,040 B2 | 12/2005 | Berestov |
| 6,987,331 B2 | 1/2006 | Koeppe |
| 6,999,553 B2 | 2/2006 | Livingston |
| 6,999,554 B2 | 2/2006 | Mertelmeier |
| 7,022,075 B2 | 4/2006 | Grunwald et al. |
| 7,025,725 B2 | 4/2006 | Dione et al. |
| 7,030,861 B1 | 4/2006 | Westerman |
| 7,110,490 B2 | 9/2006 | Eberhard |
| 7,110,502 B2 | 9/2006 | Tsuji |
| 7,117,098 B1 | 10/2006 | Dunlay et al. |
| 7,123,684 B2 | 10/2006 | Jing et al. |
| 7,127,091 B2 | 10/2006 | OpDeBeek |
| 7,142,633 B2 | 11/2006 | Eberhard |
| 7,218,766 B2 | 5/2007 | Eberhard |
| 7,245,694 B2 | 7/2007 | Jing et al. |
| 7,286,634 B2 | 10/2007 | Sommer, Jr. et al. |

| Patent | Date | Name |
|---|---|---|
| 7,289,825 B2 | 10/2007 | Fors et al. |
| 7,298,881 B2 | 11/2007 | Giger et al. |
| 7,315,607 B2 | 1/2008 | Ramsauer |
| 7,319,735 B2 | 1/2008 | Defreitas et al. |
| 7,323,692 B2 | 1/2008 | Rowlands |
| 7,346,381 B2 | 3/2008 | Okerlund et al. |
| 7,406,150 B2 | 7/2008 | Minyard et al. |
| 7,430,272 B2 | 9/2008 | Jing et al. |
| 7,443,949 B2 | 10/2008 | Defreitas et al. |
| 7,466,795 B2 | 12/2008 | Eberhard et al. |
| 7,556,602 B2 | 7/2009 | Wang et al. |
| 7,577,282 B2 | 8/2009 | Gkanatsios et al. |
| 7,606,801 B2 | 10/2009 | Faitelson et al. |
| 7,616,801 B2 | 11/2009 | Gkanatsios et al. |
| 7,630,533 B2 | 12/2009 | Ruth et al. |
| 7,634,050 B2 | 12/2009 | Muller et al. |
| 7,640,051 B2 | 12/2009 | Krishnan |
| 7,697,660 B2 | 4/2010 | Ning |
| 7,702,142 B2 | 4/2010 | Ren et al. |
| 7,705,830 B2 | 4/2010 | Westerman et al. |
| 7,760,924 B2 | 7/2010 | Ruth et al. |
| 7,769,219 B2 | 8/2010 | Zahniser |
| 7,787,936 B2 | 8/2010 | Kressy |
| 7,809,175 B2 | 10/2010 | Roehrig et al. |
| 7,828,733 B2 | 11/2010 | Zhang et al. |
| 7,831,296 B2 | 11/2010 | DeFreitas et al. |
| 7,869,563 B2 | 1/2011 | DeFreitas |
| 7,974,924 B2 | 7/2011 | Holla et al. |
| 7,991,106 B2 | 8/2011 | Ren et al. |
| 8,044,972 B2 | 10/2011 | Hall et al. |
| 8,051,386 B2 | 11/2011 | Rosander et al. |
| 8,126,226 B2 | 2/2012 | Bernard et al. |
| 8,155,421 B2 | 4/2012 | Ren et al. |
| 8,165,365 B2 | 4/2012 | Bernard et al. |
| 8,532,745 B2 | 9/2013 | DeFreitas et al. |
| 8,571,289 B2 | 10/2013 | Ruth |
| 8,594,274 B2 | 11/2013 | Hoernig et al. |
| 8,677,282 B2 | 3/2014 | Cragun et al. |
| 8,712,127 B2 | 4/2014 | Ren et al. |
| 8,787,522 B2 | 7/2014 | Smith et al. |
| 8,897,535 B2 | 11/2014 | Ruth et al. |
| 8,983,156 B2 | 3/2015 | Periaswamy et al. |
| 9,020,579 B2 | 4/2015 | Smith |
| 9,075,903 B2 | 7/2015 | Marshall |
| 9,084,579 B2 | 7/2015 | Ren et al. |
| 9,119,599 B2 | 9/2015 | Itai |
| 9,129,362 B2 | 9/2015 | Jerebko |
| 9,289,183 B2 | 3/2016 | Karssemeijer |
| 9,451,924 B2 | 9/2016 | Bernard |
| 9,456,797 B2 | 10/2016 | Ruth et al. |
| 9,478,028 B2 | 10/2016 | Parthasarathy |
| 9,589,374 B1 | 3/2017 | Gao |
| 9,592,019 B2 | 3/2017 | Sugiyama |
| 9,805,507 B2 | 10/2017 | Chen |
| 9,808,215 B2 | 11/2017 | Ruth et al. |
| 9,811,758 B2 | 11/2017 | Ren et al. |
| 9,901,309 B2 | 2/2018 | DeFreitas et al. |
| 10,008,184 B2 | 6/2018 | Kreeger et al. |
| 10,010,302 B2 | 7/2018 | Ruth et al. |
| 10,074,199 B2 | 9/2018 | Robinson et al. |
| 10,092,358 B2 | 10/2018 | DeFreitas |
| 10,111,631 B2 | 10/2018 | Gkanatsios |
| 10,242,490 B2 | 3/2019 | Karssemeijer |
| 10,276,265 B2 | 4/2019 | Reicher et al. |
| 10,282,840 B2 | 5/2019 | Moehrle et al. |
| 10,335,094 B2 | 7/2019 | DeFreitas |
| 10,357,211 B2 | 7/2019 | Smith |
| 10,410,417 B2 | 9/2019 | Chen et al. |
| 10,413,263 B2 | 9/2019 | Ruth et al. |
| 10,444,960 B2 | 10/2019 | Marshall |
| 10,456,213 B2 | 10/2019 | DeFreitas |
| 10,573,276 B2 | 2/2020 | Kreeger et al. |
| 10,575,807 B2 | 3/2020 | Gkanatsios |
| 10,595,954 B2 | 3/2020 | DeFreitas |
| 10,624,598 B2 | 4/2020 | Chen |
| 10,977,863 B2 | 4/2021 | Chen |
| 10,978,026 B2 | 4/2021 | Kreeger |
| 11,419,565 B2 | 8/2022 | Gkanatsios |
| 11,508,340 B2 | 11/2022 | Kreeger |
| 11,589,944 B2 | 2/2023 | DeFreitas |
| 11,663,780 B2 | 5/2023 | Chen |
| 11,701,199 B2 | 7/2023 | DeFreitas |
| 2001/0038681 A1 | 11/2001 | Stanton et al. |
| 2001/0038861 A1 | 11/2001 | Hsu et al. |
| 2002/0012450 A1 | 1/2002 | Tsuji |
| 2002/0050986 A1 | 5/2002 | Inoue |
| 2002/0075997 A1 | 6/2002 | Unger et al. |
| 2002/0113681 A1 | 8/2002 | Byram |
| 2002/0122533 A1 | 9/2002 | Marie et al. |
| 2002/0188466 A1 | 12/2002 | Barrette et al. |
| 2002/0193676 A1 | 12/2002 | Bodicker |
| 2003/0007598 A1 | 1/2003 | Wang |
| 2003/0018272 A1 | 1/2003 | Treado et al. |
| 2003/0026386 A1 | 2/2003 | Tang |
| 2003/0048260 A1 | 3/2003 | Matusis |
| 2003/0073895 A1 | 4/2003 | Nields et al. |
| 2003/0095624 A1 | 5/2003 | Eberhard et al. |
| 2003/0097055 A1 | 5/2003 | Yanof |
| 2003/0128893 A1 | 7/2003 | Castorina |
| 2003/0135115 A1 | 7/2003 | Burdette et al. |
| 2003/0169847 A1 | 9/2003 | Karellas |
| 2003/0194050 A1 | 10/2003 | Eberhard |
| 2003/0194121 A1 | 10/2003 | Eberhard et al. |
| 2003/0194124 A1 | 10/2003 | Suzuki et al. |
| 2003/0195433 A1 | 10/2003 | Turovskiy |
| 2003/0210254 A1 | 11/2003 | Doan |
| 2003/0212327 A1 | 11/2003 | Wang |
| 2003/0215120 A1 | 11/2003 | Uppaluri |
| 2004/0008809 A1 | 1/2004 | Webber |
| 2004/0008900 A1 | 1/2004 | Jabri et al. |
| 2004/0008901 A1 | 1/2004 | Avinash |
| 2004/0036680 A1 | 2/2004 | Davis |
| 2004/0047518 A1 | 3/2004 | Tiana |
| 2004/0052328 A1 | 3/2004 | Saboi |
| 2004/0064037 A1 | 4/2004 | Smith |
| 2004/0066884 A1 | 4/2004 | Claus |
| 2004/0066904 A1 | 4/2004 | Eberhard et al. |
| 2004/0070582 A1 | 4/2004 | Smith et al. |
| 2004/0077938 A1 | 4/2004 | Mark et al. |
| 2004/0081273 A1 | 4/2004 | Ning |
| 2004/0094167 A1 | 5/2004 | Brady |
| 2004/0101095 A1 | 5/2004 | Jing et al. |
| 2004/0109028 A1 | 6/2004 | Stern et al. |
| 2004/0109529 A1 | 6/2004 | Eberhard et al. |
| 2004/0127789 A1 | 7/2004 | Ogawa |
| 2004/0138569 A1 | 7/2004 | Grunwald |
| 2004/0171933 A1 | 9/2004 | Stoller et al. |
| 2004/0171986 A1 | 9/2004 | Tremaglio, Jr. et al. |
| 2004/0267157 A1 | 12/2004 | Miller et al. |
| 2005/0047636 A1 | 3/2005 | Gines et al. |
| 2005/0049521 A1 | 3/2005 | Miller et al. |
| 2005/0063509 A1 | 3/2005 | Defreitas et al. |
| 2005/0078797 A1 | 4/2005 | Danielsson et al. |
| 2005/0084060 A1 | 4/2005 | Seppi et al. |
| 2005/0089205 A1 | 4/2005 | Kapur |
| 2005/0105679 A1 | 5/2005 | Wu et al. |
| 2005/0107689 A1 | 5/2005 | Sasano |
| 2005/0111718 A1 | 5/2005 | MacMahon |
| 2005/0113680 A1 | 5/2005 | Ikeda et al. |
| 2005/0113681 A1 | 5/2005 | DeFreitas et al. |
| 2005/0113715 A1 | 5/2005 | Schwindt et al. |
| 2005/0124845 A1 | 6/2005 | Thomadsen et al. |
| 2005/0135555 A1 | 6/2005 | Claus |
| 2005/0135664 A1 | 6/2005 | Kaufhold |
| 2005/0226375 A1 | 10/2005 | Eberhard |
| 2006/0004278 A1 | 1/2006 | Giger et al. |
| 2006/0009693 A1 | 1/2006 | Hanover et al. |
| 2006/0018526 A1 | 1/2006 | Avinash |
| 2006/0025680 A1 | 2/2006 | Jeune-Iomme |
| 2006/0030784 A1 | 2/2006 | Miller et al. |
| 2006/0074288 A1 | 4/2006 | Kelly et al. |
| 2006/0098855 A1 | 5/2006 | Gkanatsios et al. |
| 2006/0129062 A1 | 6/2006 | Nicoson et al. |
| 2006/0132508 A1 | 6/2006 | Sadikali |
| 2006/0147099 A1 | 7/2006 | Marshall et al. |
| 2006/0154267 A1 | 7/2006 | Ma et al. |
| 2006/0155209 A1 | 7/2006 | Miller et al. |
| 2006/0197753 A1 | 9/2006 | Hotelling |

| | | | | | |
|---|---|---|---|---|---|
| 2006/0210131 A1 | 9/2006 | Wheeler | 2010/0135558 A1 | 6/2010 | Ruth et al. |
| 2006/0228012 A1 | 10/2006 | Masuzawa | 2010/0152570 A1 | 6/2010 | Navab |
| 2006/0238546 A1 | 10/2006 | Handley | 2010/0166147 A1 | 7/2010 | Abenaim |
| 2006/0257009 A1 | 11/2006 | Wang | 2010/0166267 A1 | 7/2010 | Zhang |
| 2006/0269040 A1 | 11/2006 | Mertelmeier | 2010/0171764 A1 | 7/2010 | Feng et al. |
| 2006/0274928 A1 | 12/2006 | Collins et al. | 2010/0189322 A1 | 7/2010 | Sakagawa |
| 2006/0291618 A1 | 12/2006 | Eberhard et al. | 2010/0195882 A1 | 8/2010 | Ren et al. |
| 2007/0014468 A1 | 1/2007 | Gines et al. | 2010/0208037 A1 | 8/2010 | Sendai |
| 2007/0019846 A1 | 1/2007 | Bullitt et al. | 2010/0231522 A1 | 9/2010 | Li |
| 2007/0030949 A1 | 2/2007 | Jing et al. | 2010/0246884 A1 | 9/2010 | Chen et al. |
| 2007/0036265 A1 | 2/2007 | Jing et al. | 2010/0246909 A1 | 9/2010 | Blum |
| 2007/0046649 A1 | 3/2007 | Reiner | 2010/0259561 A1 | 10/2010 | Forutanpour et al. |
| 2007/0047793 A1 | 3/2007 | Wu et al. | 2010/0259645 A1 | 10/2010 | Kaplan |
| 2007/0052700 A1 | 3/2007 | Wheeler et al. | 2010/0260316 A1 | 10/2010 | Stein et al. |
| 2007/0076844 A1 | 4/2007 | Defreitas et al. | 2010/0280375 A1 | 11/2010 | Zhang |
| 2007/0114424 A1 | 5/2007 | Danielsson et al. | 2010/0293500 A1 | 11/2010 | Cragun |
| 2007/0118400 A1 | 5/2007 | Morita et al. | 2011/0018817 A1 | 1/2011 | Kryze |
| 2007/0156451 A1 | 7/2007 | Gering | 2011/0019891 A1 | 1/2011 | Puong |
| 2007/0223651 A1 | 9/2007 | Wagenaar et al. | 2011/0054944 A1 | 3/2011 | Sandberg et al. |
| 2007/0225600 A1 | 9/2007 | Weibrecht et al. | 2011/0069808 A1 | 3/2011 | Defreitas et al. |
| 2007/0236490 A1 | 10/2007 | Casteele | 2011/0069906 A1 | 3/2011 | Park |
| 2007/0242800 A1 | 10/2007 | Jing et al. | 2011/0087132 A1 | 4/2011 | DeFreitas et al. |
| 2007/0263765 A1 | 11/2007 | Wu | 2011/0105879 A1 | 5/2011 | Masumoto |
| 2007/0274585 A1 | 11/2007 | Zhang et al. | 2011/0109650 A1 | 5/2011 | Kreeger |
| 2008/0019581 A1 | 1/2008 | Gkanatsios et al. | 2011/0110570 A1 | 5/2011 | Bar-Shalev |
| 2008/0043905 A1 | 2/2008 | Hassanpourgol | 2011/0110576 A1 | 5/2011 | Kreeger |
| 2008/0045833 A1 | 2/2008 | DeFreitas et al. | 2011/0123073 A1 | 5/2011 | Gustafson |
| 2008/0101537 A1 | 5/2008 | Sendai | 2011/0125526 A1 | 5/2011 | Gustafson |
| 2008/0114614 A1 | 5/2008 | Mahesh et al. | 2011/0134113 A1 | 6/2011 | Ma et al. |
| 2008/0125643 A1 | 5/2008 | Huisman | 2011/0150447 A1 | 6/2011 | Li |
| 2008/0130979 A1 | 6/2008 | Ren | 2011/0157154 A1 | 6/2011 | Bernard et al. |
| 2008/0139896 A1 | 6/2008 | Baumgart | 2011/0163939 A1 | 7/2011 | Tam et al. |
| 2008/0152086 A1 | 6/2008 | Hall | 2011/0178389 A1 | 7/2011 | Kumar et al. |
| 2008/0165136 A1 | 7/2008 | Christie et al. | 2011/0182402 A1 | 7/2011 | Partain |
| 2008/0187095 A1 | 8/2008 | Boone et al. | 2011/0234630 A1 | 9/2011 | Batman et al. |
| 2008/0198966 A1 | 8/2008 | Hjarn | 2011/0237927 A1 | 9/2011 | Brooks et al. |
| 2008/0221479 A1 | 9/2008 | Ritchie | 2011/0242092 A1 | 10/2011 | Kashiwagi |
| 2008/0229256 A1 | 9/2008 | Shibaike | 2011/0310126 A1 | 12/2011 | Georgiev et al. |
| 2008/0240533 A1 | 10/2008 | Piron et al. | 2012/0014501 A1 | 1/2012 | Pelc |
| 2008/0297482 A1 | 12/2008 | Weiss | 2012/0014504 A1 | 1/2012 | Jang |
| 2009/0003519 A1 | 1/2009 | DeFreitas | 2012/0014578 A1 | 1/2012 | Karssemeijer |
| 2009/0005668 A1 | 1/2009 | West et al. | 2012/0069951 A1 | 3/2012 | Toba |
| 2009/0005693 A1 | 1/2009 | Brauner | 2012/0106698 A1 | 5/2012 | Karim |
| 2009/0010384 A1 | 1/2009 | Jing et al. | 2012/0127297 A1 | 5/2012 | Baxi |
| 2009/0034684 A1 | 2/2009 | Bernard | 2012/0131488 A1 | 5/2012 | Karlsson et al. |
| 2009/0037821 A1 | 2/2009 | O'Neal et al. | 2012/0133600 A1 | 5/2012 | Marshall |
| 2009/0063118 A1 | 3/2009 | Dachille et al. | 2012/0133601 A1 | 5/2012 | Marshall |
| 2009/0079705 A1 | 3/2009 | Sizelove et al. | 2012/0134464 A1 | 5/2012 | Hoernig et al. |
| 2009/0080594 A1 | 3/2009 | Brooks et al. | 2012/0148151 A1 | 6/2012 | Hamada |
| 2009/0080602 A1 | 3/2009 | Brooks et al. | 2012/0150034 A1 | 6/2012 | DeFreitas et al. |
| 2009/0080604 A1 | 3/2009 | Shores et al. | 2012/0189092 A1 | 7/2012 | Jerebko |
| 2009/0080752 A1 | 3/2009 | Ruth | 2012/0194425 A1 | 8/2012 | Buelow |
| 2009/0080765 A1 | 3/2009 | Bernard et al. | 2012/0238870 A1 | 9/2012 | Smith et al. |
| 2009/0087067 A1 | 4/2009 | Khorasani | 2012/0277625 A1 | 11/2012 | Nakayama |
| 2009/0123052 A1 | 5/2009 | Ruth | 2012/0293511 A1 | 11/2012 | Mertelmeier |
| 2009/0129644 A1 | 5/2009 | Daw et al. | 2013/0016255 A1 | 1/2013 | Bhatt |
| 2009/0135997 A1 | 5/2009 | Defreitas et al. | 2013/0022165 A1 | 1/2013 | Jang |
| 2009/0138280 A1 | 5/2009 | Morita et al. | 2013/0044861 A1 | 2/2013 | Muller |
| 2009/0143674 A1 | 6/2009 | Nields | 2013/0059758 A1 | 3/2013 | Haick |
| 2009/0167702 A1 | 7/2009 | Nurmi | 2013/0108138 A1 | 5/2013 | Nakayama |
| 2009/0171244 A1 | 7/2009 | Ning | 2013/0121569 A1 | 5/2013 | Yadav |
| 2009/0238424 A1 | 9/2009 | Arakita | 2013/0121618 A1 | 5/2013 | Yadav |
| 2009/0259958 A1 | 10/2009 | Ban | 2013/0202168 A1 | 8/2013 | Jerebko |
| 2009/0268865 A1 | 10/2009 | Ren et al. | 2013/0259193 A1 | 10/2013 | Packard |
| 2009/0278812 A1 | 11/2009 | Yasutake | 2013/0272494 A1* | 10/2013 | DeFreitas .............. A61B 6/025 |
| 2009/0296882 A1 | 12/2009 | Gkanatsios et al. | | | 378/37 |
| 2009/0304147 A1 | 12/2009 | Jing et al. | 2014/0033126 A1 | 1/2014 | Kreeger |
| 2010/0034348 A1 | 2/2010 | Yu | 2014/0035811 A1 | 2/2014 | Guehring |
| 2010/0049046 A1 | 2/2010 | Peiffer | 2014/0064444 A1 | 3/2014 | Oh |
| 2010/0054400 A1 | 3/2010 | Ren et al. | 2014/0073913 A1 | 3/2014 | DeFreitas et al. |
| 2010/0067648 A1 | 3/2010 | Kojima | 2014/0082542 A1 | 3/2014 | Zhang et al. |
| 2010/0079405 A1 | 4/2010 | Bernstein | 2014/0200433 A1* | 7/2014 | Choi .................. G06V 10/809 |
| 2010/0086188 A1 | 4/2010 | Ruth et al. | | | 600/407 |
| 2010/0088346 A1 | 4/2010 | Urness et al. | 2014/0219534 A1 | 8/2014 | Wiemker et al. |
| 2010/0098214 A1 | 4/2010 | Star-Lack et al. | 2014/0219548 A1 | 8/2014 | Wels |
| 2010/0105879 A1 | 4/2010 | Katayose et al. | 2014/0276061 A1 | 9/2014 | Lee et al. |
| 2010/0121178 A1 | 5/2010 | Krishnan | 2014/0327702 A1 | 11/2014 | Kreeger et al. |
| 2010/0131294 A1 | 5/2010 | Venon | 2014/0328517 A1 | 11/2014 | Gluncic |
| 2010/0131482 A1 | 5/2010 | Linthicum et al. | 2015/0004558 A1 | 1/2015 | Inglese |

| | | |
|---|---|---|
| 2015/0052471 A1 | 2/2015 | Chen |
| 2015/0061582 A1 | 4/2015 | Smith |
| 2015/0238148 A1 | 8/2015 | Georgescu |
| 2015/0258271 A1 | 9/2015 | Love |
| 2015/0302146 A1 | 10/2015 | Marshall |
| 2015/0309712 A1 | 10/2015 | Marshall |
| 2015/0317538 A1 | 11/2015 | Ren et al. |
| 2015/0331995 A1 | 11/2015 | Zhao |
| 2016/0000399 A1 | 1/2016 | Halmann et al. |
| 2016/0022364 A1 | 1/2016 | DeFreitas et al. |
| 2016/0051215 A1 | 2/2016 | Chen |
| 2016/0078645 A1 | 3/2016 | Abdurahman |
| 2016/0140749 A1 | 5/2016 | Erhard |
| 2016/0210774 A1 | 7/2016 | Wiskin et al. |
| 2016/0228034 A1 | 8/2016 | Gluncic |
| 2016/0235380 A1 | 8/2016 | Smith |
| 2016/0350933 A1 | 12/2016 | Schieke |
| 2016/0364526 A1 | 12/2016 | Reicher et al. |
| 2016/0367210 A1 | 12/2016 | Gkanatsios |
| 2017/0071562 A1 | 3/2017 | Suzuki |
| 2017/0132792 A1 | 5/2017 | Jerebko et al. |
| 2017/0202453 A1 | 7/2017 | Sekiguchi |
| 2017/0262737 A1 | 9/2017 | Rabinovich |
| 2018/0008220 A1 | 1/2018 | Boone et al. |
| 2018/0008236 A1 | 1/2018 | Venkataraman et al. |
| 2018/0047211 A1 | 2/2018 | Chen et al. |
| 2018/0109698 A1 | 4/2018 | Ramsay et al. |
| 2018/0132722 A1 | 5/2018 | Eggers et al. |
| 2018/0137385 A1 | 5/2018 | Ren |
| 2018/0144244 A1 | 5/2018 | Masoud |
| 2018/0256118 A1 | 9/2018 | DeFreitas |
| 2019/0000318 A1 | 1/2019 | Caluser |
| 2019/0015173 A1 | 1/2019 | DeFreitas |
| 2019/0037173 A1 | 1/2019 | Lee et al. |
| 2019/0043456 A1 | 2/2019 | Kreeger |
| 2019/0057778 A1 | 2/2019 | Porter et al. |
| 2019/0287241 A1 | 9/2019 | Hill et al. |
| 2019/0290221 A1 | 9/2019 | Smith |
| 2019/0325573 A1 | 10/2019 | Bernard et al. |
| 2020/0046303 A1 | 2/2020 | DeFreitas |
| 2020/0054300 A1 | 2/2020 | Kreeger et al. |
| 2020/0093562 A1 | 3/2020 | DeFreitas |
| 2020/0184262 A1 | 6/2020 | Chui |
| 2020/0205928 A1 | 7/2020 | DeFreitas |
| 2020/0253573 A1 | 8/2020 | Gkanatsios |
| 2020/0345320 A1 | 11/2020 | Chen |
| 2020/0390404 A1 | 12/2020 | DeFreitas |
| 2021/0000553 A1 | 1/2021 | St. Pierre |
| 2021/0100518 A1 | 4/2021 | Chui |
| 2021/0100626 A1 | 4/2021 | St. Pierre |
| 2021/0113167 A1 | 4/2021 | Chui |
| 2021/0118199 A1 | 4/2021 | Chui |
| 2021/0174504 A1* | 6/2021 | Madabhushi ......... G16H 30/40 |
| 2021/0212665 A1 | 7/2021 | Tsymbalenko |
| 2022/0005277 A1 | 1/2022 | Chen |
| 2022/0013089 A1 | 1/2022 | Kreeger |
| 2022/0036545 A1 | 2/2022 | St. Pierre |
| 2022/0192615 A1 | 6/2022 | Chui |
| 2022/0254023 A1 | 8/2022 | McKinney et al. |
| 2022/0386969 A1 | 12/2022 | Smith |
| 2023/0000467 A1 | 1/2023 | Shi |
| 2023/0008465 A1 | 1/2023 | Smith |
| 2023/0033601 A1 | 2/2023 | Chui |
| 2023/0038498 A1 | 2/2023 | Xu |
| 2023/0053489 A1 | 2/2023 | Kreeger |
| 2023/0054121 A1 | 2/2023 | Chui |
| 2023/0056692 A1 | 2/2023 | Gkanatsios |
| 2023/0082494 A1 | 3/2023 | Chui |
| 2023/0098305 A1 | 3/2023 | St. Pierre |
| 2023/0103969 A1 | 4/2023 | St. Pierre |
| 2023/0124481 A1 | 4/2023 | St. Pierre |
| 2023/0125385 A1 | 4/2023 | Solis |
| 2023/0225821 A1 | 7/2023 | DeFreitas |
| 2023/0230679 A1 | 7/2023 | Chen |
| 2023/0240785 A1 | 8/2023 | DeFreitas |
| 2023/0344453 A1 | 10/2023 | Yang |
| 2023/0394769 A1 | 12/2023 | Chen |
| 2024/0169958 A1 | 5/2024 | Kreeger |
| 2024/0315654 A1 | 9/2024 | Chui |
| 2024/0338864 A1 | 10/2024 | Chui |
| 2024/0341698 A1 | 10/2024 | DeFreitas |

FOREIGN PATENT DOCUMENTS

| | | |
|---|---|---|
| CN | 1846622 | 10/2006 |
| CN | 101066212 A | 11/2007 |
| CN | 102169530 A | 8/2011 |
| CN | 202161328 | 3/2012 |
| CN | 102429678 | 5/2012 |
| CN | 102473300 A | 5/2012 |
| CN | 105193447 | 12/2015 |
| CN | 106659468 A | 5/2017 |
| CN | 107440730 | 12/2017 |
| CN | 112561908 A | 3/2021 |
| DE | 102010009295 | 8/2011 |
| DE | 102011087127 | 5/2013 |
| EP | 775467 | 5/1997 |
| EP | 982001 | 3/2000 |
| EP | 1428473 | 6/2004 |
| EP | 2236085 | 6/2010 |
| EP | 2215600 | 8/2010 |
| EP | 2301432 | 3/2011 |
| EP | 2491863 | 8/2012 |
| EP | 1986548 | 1/2013 |
| EP | 2656789 | 10/2013 |
| EP | 2823464 | 1/2015 |
| EP | 2823765 | 1/2015 |
| EP | 2889743 | 7/2015 |
| EP | 3060132 | 4/2019 |
| JP | H09-35043 | 2/1997 |
| JP | H09-198490 | 7/1997 |
| JP | H09-238934 | 9/1997 |
| JP | H10-33523 | 2/1998 |
| JP | 2000-200340 | 7/2000 |
| JP | 2002-109510 | 4/2002 |
| JP | 2002-282248 | 10/2002 |
| JP | 2003-126073 | 5/2003 |
| JP | 2003-189179 | 7/2003 |
| JP | 2003-199737 | 7/2003 |
| JP | 2003-531516 | 10/2003 |
| JP | 2004254742 | 9/2004 |
| JP | 2005-110843 | 4/2005 |
| JP | 2005-522305 | 7/2005 |
| JP | 2005-227350 | 8/2005 |
| JP | 2005-322257 | 11/2005 |
| JP | 2006-519634 | 8/2006 |
| JP | 2006-312026 | 11/2006 |
| JP | 2007-130487 | 5/2007 |
| JP | 2007-216022 | 8/2007 |
| JP | 2007-325928 | 12/2007 |
| JP | 2007-330334 | 12/2007 |
| JP | 2007-536968 | 12/2007 |
| JP | 2008-068032 | 3/2008 |
| JP | 2008518684 | 6/2008 |
| JP | 2008-253401 | 10/2008 |
| JP | 2009-034503 | 2/2009 |
| JP | 2009-522005 | 6/2009 |
| JP | 2009-526618 | 7/2009 |
| JP | 2009-207545 | 9/2009 |
| JP | 2010-137004 | 6/2010 |
| JP | 2011-110175 A | 6/2011 |
| JP | 2012-011255 | 1/2012 |
| JP | 2012-501750 | 1/2012 |
| JP | 2012-061196 | 3/2012 |
| JP | 2013-530768 | 8/2013 |
| JP | 2013-244211 | 12/2013 |
| JP | 2014-507250 | 3/2014 |
| JP | 2014-534042 | 12/2014 |
| JP | 2015-506794 | 3/2015 |
| JP | 2015-144632 A | 8/2015 |
| JP | 2016-198197 | 12/2015 |
| JP | 2016059743 | 4/2016 |
| JP | 2017-000364 | 1/2017 |
| JP | 2017-056358 | 3/2017 |
| KR | 10-2015-0010515 | 1/2015 |
| KR | 10-2017-0062839 | 6/2017 |
| WO | 90/05485 | 5/1990 |

| | | |
|---|---|---|
| WO | 93/17620 | 9/1993 |
| WO | 94/06352 | 3/1994 |
| WO | 1997/00649 | 1/1997 |
| WO | 1998/16903 | 4/1998 |
| WO | 00/51484 | 9/2000 |
| WO | 2003/020114 | 3/2003 |
| WO | 03/077202 | 9/2003 |
| WO | 2005051197 | 6/2005 |
| WO | 2005/110230 | 11/2005 |
| WO | 2005/112767 | 12/2005 |
| WO | 2006/055830 | 5/2006 |
| WO | 2006/058160 | 6/2006 |
| WO | 2007/095330 | 8/2007 |
| WO | 08/014670 | 2/2008 |
| WO | 2008047270 | 4/2008 |
| WO | 2008/050823 | 5/2008 |
| WO | 2008/054436 | 5/2008 |
| WO | 2009/026587 | 2/2009 |
| WO | 2010/028208 | 3/2010 |
| WO | 2010059920 | 5/2010 |
| WO | 2011008239 | 1/2011 |
| WO | 2011/043838 | 4/2011 |
| WO | 2011065950 | 6/2011 |
| WO | 2011073864 | 6/2011 |
| WO | 2011091300 | 7/2011 |
| WO | 2012/001572 | 1/2012 |
| WO | 2012/068373 | 5/2012 |
| WO | 2012063653 | 5/2012 |
| WO | 2012/112627 | 8/2012 |
| WO | 2012/122399 | 9/2012 |
| WO | 2013/001439 | 1/2013 |
| WO | 2013/035026 | 3/2013 |
| WO | 2013/087476 | 5/2013 |
| WO | 2013/123091 | 8/2013 |
| WO | 2013/136222 | 9/2013 |
| WO | 2014/080215 | 5/2014 |
| WO | 2014/149554 | 9/2014 |
| WO | 2014/207080 | 12/2014 |
| WO | 2015/061582 | 4/2015 |
| WO | 2015/066650 | 5/2015 |
| WO | 2015/130916 | 9/2015 |
| WO | 2016/103094 | 6/2016 |
| WO | 2016/184746 | 11/2016 |
| WO | 2016/206942 | 12/2016 |
| WO | 2018/183548 | 10/2018 |
| WO | 2018/183549 | 10/2018 |
| WO | 2018/183550 | 10/2018 |
| WO | 2018/236565 | 12/2018 |
| WO | 2019/032558 | 2/2019 |
| WO | 2019/091807 | 5/2019 |
| WO | 2021/021329 | 2/2021 |
| WO | 2021/168281 | 8/2021 |
| WO | 2021/195084 | 9/2021 |

OTHER PUBLICATIONS

PCT International Search Report and Written Opinion in International Application PCT/US2022/080432, mailed Mar. 22, 2023, 17 pages.
"Filtered Back Projection", (Nygren), published May 8, 2007, URL: http://web.archive.org/web/19991010131715/http://www.owlnet.rice.edu/~elec539/Projects97/cult/node2.html, 2 pgs.
"Supersonic to feature Aixplorer Ultimate at ECR", AuntiMinnie.com, 3 pages (Feb. 2018).
Al Sallab et al., "Self Learning Machines Using Deep Networks", Soft Computing and Pattern Recognition (SoCPaR), 2011 Int'l. Conference of IEEE, Oct. 14, 2011, pp. 21-26.
Berg, WA et al., "Combined screening with ultrasound and mammography vs mammography alone in women at elevated risk of breast cancer", JAMA 299:2151-2163, 2008.
Burbank, Fred, "Stereotactic Breast Biopsy: Its History, Its Present, and Its Future", published in 1996 at the Southeastern Surgical Congress, 24 pages.
Bushberg, Jerrold et al., "The Essential Physics of Medical Imaging", 3rd ed., In: "The Essential Physics of Medical Imaging, Third Edition", Dec. 28, 2011, Lippincott & Wilkins, Philadelphia, PA, USA, XP05579051, pp. 270-272.
Caroline, B.E. et al., "Computer aided detection of masses in digital breast tomosynthesis: A review", 2012 International Conference on Emerging Trends in Science, Engineering and Technology (INCOSET), Tiruchirappalli, 2012, pp. 186-191.
Carton, AK, et al., "Dual-energy contrast-enhanced digital breast tomosynthesis—a feasibility study", BR J Radiol. Apr. 2010;83 (988):344-50.
Chan, Heang-Ping et al., "Computer-aided detection system for breast masses on digital tomosynthesis mammograms: Preliminary Experience", Radiology, Dec. 2005, 1075-1080.
Chan, Heang-Ping et al., "ROC Study of the effect of stereoscopic imaging on assessment of breast lesions," Medical Physics, vol. 32, No. 4, Apr. 2005, 1001-1009.
Chen, SC, et al., "Initial clinical experience with contrast-enhanced digital breast tomosynthesis", Acad Radio. Feb. 2007 14(2):229-38.
Cho, N. et al., "Distinguishing Benign from Malignant Masses at Breast US: Combined US Elastography and Color Doppler US-Influence on Radiologist Accuracy", Radiology, 262(1): 80-90 (Jan. 2012).
Conner, Peter, "Breast Response to Menopausal Hormone Therapy—Aspects on Proliferation, apoptosis and Mammographic Density", 2007 Annals of Medicine, 39;1, 28-41.
Diekmann, Felix et al., "Thick Slices from Tomosynthesis Data Sets: Phantom Study for the Evaluation of Different Algorithms", Journal of Digital Imaging, Springer, vol. 22, No. 5, Oct. 23, 2007, pp. 519-526.
Diekmann, Felix., et al., "Digital mammography using iodine-based contrast media: initial clinical experience with dynamic contrast medium enhancement", Invest Radiol 2005; 40:397-404.
Dromain C., et al., "Contrast enhanced spectral mammography: a multi-reader study", RSNA 2010, 96th Scientific Assembly and Scientific Meeting.
Dromain, C., et al., "Contrast-enhanced digital mammography", Eur J Radiol. 2009; 69:34-42.
Dromain, Clarisse et al., "Dual-energy contrast-enhanced digital mammography: initial clinical results", European Radiology, Sep. 14, 2010, vol. 21, pp. 565-574.
Dromain, Clarisse, et al., "Evaluation of tumor angiogenesis of breast carcinoma using contrast-enhanced digital mammography", AJR: 187, Nov. 2006, 16 pages.
Duan, Xiaoman et al., "Matching corresponding regions of interest on cranio-caudal and medio-lateral oblique view mammograms", IEEE Access, vol. 7, Mar. 25, 2019, pp. 31586-31597, XP011715754, DOI: 10.1109/Access.2019.2902854, retrieved on Mar. 20, 2019, abstract.
E. Shaw de Paredes et al., "Interventional Breast Procedure", published Sep./Oct. 1998 in Curr Probl Diagn Radiol, pp. 138-184.
EFilm Mobile HD by Merge Healthcare, web site: http://itunes.apple.com/bw/app/efilm-mobile-hd/id405261243?mt=8, accessed on Nov. 3, 2011 (2 pages).
EFilm Solutions, eFilm Workstation (tm) 3.4, website: http://estore.merge.com/na/estore/content.aspx?productID=405, accessed on Nov. 3, 2011 (2 pages).
Elbakri, Idris A. et al., "Automatic exposure control for a slot scanning full field digital mammography system", Med. Phys. 2005; Sep. 32(9):2763-2770, Abstract only.
Ertas, M. et al., "2D versus 3D total variation minimization in digital breast tomosynthesis", 2015 IEEE International Conference on Imaging Systems and Techniques (IST), Macau, 2015, pp. 1-4.
Feng, Steve Si Jia, et al., "Clinical digital breast tomosynthesis system: Dosimetric Characterization", Radiology, Apr. 2012, 263(1); pp. 35-42.
Fischer Imaging Corp, Mammotest Plus manual on minimally invasive breast biopsy system, 2002, 8 pages.
Fischer Imaging Corporation, Installation Manual, MammoTest Family of Breast Biopsy Systems, 86683G, 86684G, P-55957-IM, Issue 1, Revision 3, Jul. 2005, 98 pages.
Fischer Imaging Corporation, Operator Manual, MammoTest Family of Breast Biopsy Systems, 86683G, 86684G, P-55956-OM, Issue 1, Revision 6, Sep. 2005, 258 pages.
Freiherr, G., "Breast tomosynthesis trials show promise", Diagnostic Imaging—San Francisco 2005, V27; N4:42-48.

Georgian-Smith, Dianne, et al., "Stereotactic Biopsy of the Breast Using an Upright Unit, a Vacuum-Suction Needle, and a Lateral Arm-Support System", 2001, at the American Roentgen Ray Society meeting, 8 pages.

Ghiassi, M. et al., "A Dynamic Architecture for Artificial Networks", Neurocomputing, vol. 63, Aug. 20, 2004, pp. 397-413.

Giger et al. "Development of a smart workstation for use in mammography", in Proceedings of SPIE, vol. 1445 (1991), pp. 101103; 4 pages.

Giger et al., "An Intelligent Workstation for Computer-aided Diagnosis", in RadioGraphics, May 1993, 13:3 pp. 647-656; 10 pages.

Glick, Stephen J., "Breast CT", Annual Rev. Biomed. Eng., 2007, 9;501-26.

Green, C. et al., "Deformable mapping using biochemical models to relate corresponding lesions in digital breast tomosynthesis and automated breast ultrasound images", Medical Image Analysis, 60: 1-18 (Nov. 2019).

Hologic, "Lorad StereoLoc II" Operator's Manual 9-500-0261, Rev. 005, 2004, 78 pgs.

Hologic, Inc., 510(k) Summary, prepared Nov. 28, 2010, for Affirm Breast Biopsy Guidance System Special 510(k) Premarket Notification, 5 pages.

Hologic, Inc., 510(k) Summary, prepared Aug. 14, 2012, for Affirm Breast Biopsy Guidance System Special 510(k) Premarket Notification, 5 pages.

ICRP Publication 60: 1990 Recommendations of the International Commission on Radiological Protection, 12 pages.

Ijaz, Umer Zeeshan, et al., "Mammography phantom studies using 3D electrical impedance tomography with numerical forward solver", Frontiers in the Convergence of Bioscience and Information Technologies 2007, 379-383.

Jochelson, M., et al., "Bilateral Dual Energy contrast-enhanced digital mammography: Initial Experience", RSNA 2010, 96th Scientific Assembly and Scientific Meeting, 1 page.

Jong, RA, et al., Contrast-enhanced digital mammography: initial clinical experience. Radiology 2003; 228:842-850.

Kao, Tzu-Jen et al., "Regional admittivity spectra with tomosynthesis images for breast cancer detection", Proc. of the 29th Annual Int'l. Conf. of the IEEE EMBS, Aug. 23-26, 2007, 4142-4145.

Kim, Eun Sil, et al., "Significance of microvascular evaluation of ductal lesions on breast ultrasonography: Influence on diagnostic performance", Clinical Imaging, Elsevier, NY, vol. 51, Jun. 6, 2018, pp. 252-259.

Koechli, Ossi R., "Available Sterotactic Systems for Breast Biopsy", Renzo Brun del Re (Ed.), Minimally Invasive Breast Biopsies, Recent Results in Cancer Research 173:105-113; Springer-Verlag, 2009.

Kopans, Daniel B., "Breast Imaging", 3rd Edition, Lippincott Williams and Wilkins, published Nov. 2, 2006, pp. 960-967.

Kopans, et al. Will tomosynthesis replace conventional mammography? Plenary Session SFN08: RSNA 2005.

Lee, E. et al., "Combination of Quantitative Parameters of Shear Wave Elastography and Superb Microvascular Imaging to Evaluate Breast Masses", Korean Journal of Radiology: Official Journal of the Korean Radiological Society, 21(9): 1045-1054 (Jan. 2020).

Lehman, CD, et al. MRI evaluation of the contralateral breast in women with recently diagnosed breast cancer. N Engl J Med 2007; 356:1295-1303.

Lewin, JM, et al., Dual-energy contrast-enhanced digital subtraction mammography: feasibility. Radiology 2003; 229:261-268.

Lilja, Mikko, "Fast and accurate voxel projection technique in free-form cone-beam geometry with application to algebraic reconstruction," Applies Sciences on Biomedical and Communication Technologies, 2008, Isabel '08, first international symposium on, IEEE, Piscataway, NJ, Oct. 25, 2008.

Lindfors, KK, et al., Dedicated breast CT: initial clinical experience. Radiology 2008; 246(3): 725-733.

Love, Susan M., et al. "Anatomy of the nipple and breast ducts revisited", Cancer, American Cancer Society, Philadelphia, PA, vol. 101, No. 9, Sep. 20, 2004, pp. 1947-1957.

Mahesh, Mahadevappa, "AAPM/RSNA Physics Tutorial for Residents—Digital Mammography: An Overview", Nov.-Dec. 2004, vol. 24, No. 6, 1747-1760.

Metheany, Kathrine G. et al., "Characterizing anatomical variability in breast CT images", Oct. 2008, Med. Phys. 35 (10); 4685-4694.

Niklason, L., et al., Digital tomosynthesis in breast imaging. Radiology. Nov. 1997; 205(2):399-406.

Nikunjc, Oza et al., Dietterich, T.G., Ed., "Ensemble methods in machine learning", Jan. 1, 2005, Multiple Classifier Systems, Lecture Notes in Computer Science; LNCS, Springer-Verlag Berlin/Heidelberg, pp. 1-15, abstract.

Pathmanathan et al., "Predicting tumour location by simulating large deformations of the breast using a 3D finite element model and nonlinear elasticity", Medical Image Computing and Computer-Assisted Intervention, pp. 217-224, vol. 3217 (2004).

Pediconi, "Color-coded automated signal intensity-curve for detection and characterization of breast lesions: Preliminary evaluation of new software for MR-based breast imaging," International Congress Series 1281 (2005) 1081-1086.

Poplack, SP, et al., Digital breast tomosynthesis: initial experience in 98 women with abnormal digital screening mammography. AJR Am J Roentgenology Sep. 2007 189(3):616-23.

Prionas, ND, et al., Contrast-enhanced dedicated breast CT: initial clinical experience. Radiology. Sep. 2010 256(3):714-723.

Rafferty, E. et al., "Assessing Radiologist Performance Using Combined Full-Field Digital Mammography and Breast Tomosynthesis Versus Full-Field Digital Mammography Alone: Results" presented at 2007 Radiological Society of North America meeting, Chicago IL.

Reynolds, April, "Stereotactic Breast Biopsy: A Review", Radiologic Technology, vol. 80, No. 5, Jun. 1, 2009, pp. 447M-464M, XP055790574.

Sakic et al., "Mammogram synthesis using a 3D simulation. I. breast tissue model and image acquisition simulation" Medical Physics. 29, pp. 2131-2139 (2002).

Samani, A. et al., "Biomechanical 3-D Finite Element Modeling of the Human Breast Using MRI Data", 2001, IEEE Transactions on Medical Imaging, vol. 20, No. 4, pp. 271-279.

Samulski, Maurice et al., "Optimizing case-based detection performance in a multiview CAD system for mammography", IEEE Transactions on Medical Imaging, vol. 30, No. 4, Apr. 1, 2011, pp. 1001-1009, XP011352387, ISSN: 0278-0062, DOI: 10.1109/TMI.2011.2105886, abstract.

Sechopoulos, et al., "Glandular radiation dose in tomosynthesis of the breast using tungsten targets", Journal of Applied Clinical Medical Physics, vol. 8, No. 4, Fall 2008, 161-171.

Shrading, Simone et al., "Digital Breast Tomosynthesis-guided Vacuum-assisted Breast Biopsy: Initial Experiences and Comparison with Prone Stereotactic Vacuum-assisted Biopsy", the Department of Diagnostic and Interventional Radiology, Univ. of Aachen, Germany, published Nov. 12, 2014, 10 pgs.

Smith, A., "Full field breast tomosynthesis", Radiol Manage. Sep.-Oct. 2005; 27(5):25-31.

Taghibakhsh, f. et al., "High dynamic range 2-TFT amplified pixel sensor architecture for digital mammography tomosynthesis", IET Circuits Devices Syst., 2007, 1(10, pp. 87-92.

Van Schie, Guido, et al., "Generating Synthetic Mammograms from Reconstructed Tomosynthesis Volumes", IEEE Transactions on Medical Imaging, vol. 32, No. 12, Dec. 2013, 2322-2331.

Van Schie, Guido, et al., "Mass detection in reconstructed digital breast tomosynthesis volumes with a computer-aided detection system trained on 2D mammograms", Med. Phys. 40(4), Apr. 2013, 41902-1-41902-11.

Varjonen, Mari, "Three-Dimensional Digital Breast Tomosynthesis in the Early Diagnosis and Detection of Breast Cancer", IWDM 2006, LNCS 4046, 152-159.

Weidner N, et al., "Tumor angiogenesis and metastasis: correlation in invasive breast carcinoma", New England Journal of Medicine 1991; 324:1-8.

Weidner, N, "The importance of tumor angiogenesis: the evidence continues to grow", AM J Clin Pathol. Nov. 2004 122(5):696-703.

Wen, Junhai et al., "A study on truncated cone-beam sampling strategies for 3D mammography", 2004, IEEE, 3200-3204.

Williams, Mark B. et al., "Optimization of exposure parameters in full field digital mammography", Medical Physics 35, 2414 (May 20, 2008); doi: 10.1118/1.2912177, pp. 2414-2423.

Wodajo, Felasfa, MD, "Now Playing: Radiology Images from Your Hospital PACS on your iPad," Mar. 17, 2010; web site: http://www.imedicalapps.com/2010/03/now-playing-radiology-images-from-your-hospital-pacs-on-your-ipad/, accessed on Nov. 3, 2011 (3 pages).

Yin, H.M., et al., "Image Parser: a tool for finite element generation from three-dimensional medical images", BioMedical Engineering Online. 3:31, pp. 1-9, Oct. 1, 2004.

Zhang, Yiheng et al., "A comparative study of limited-angle cone-beam reconstruction methods for breast tomosythesis", Med Phys., Oct. 2006, 33(10): 3781-3795.

Zhao, Bo, et al., "Imaging performance of an amorphous selenium digital mammography detector in a breast tomosynthesis system", May 2008, Med. Phys 35(5); 1978-1987.

\* cited by examiner

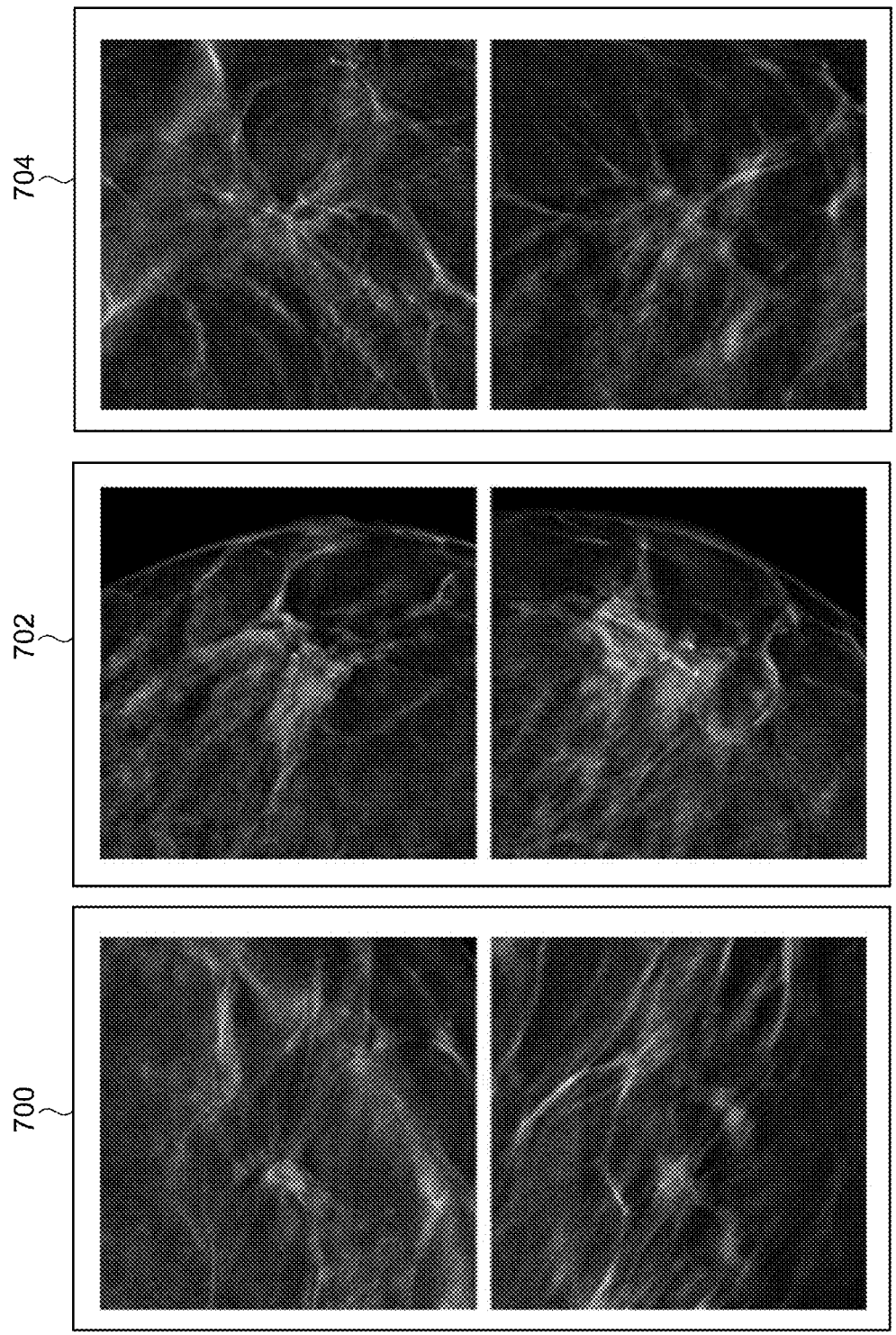

SYSTEMS AND METHODS FOR CORRELATING OBJECTS OF INTEREST

CROSS-REFERENCE TO RELATED APPLICATION

This application is a continuation of PCT International Patent Application No. PCT/US2022/080432, filed on Nov. 23, 2022, which claims the benefit of U.S. Provisional Application No. 63/283,866, filed Nov. 29, 2021, the entire disclosures of which are incorporated herein by reference in their entireties. To the extent appropriate, a claim of priority is made to each of the above disclosed applications.

BACKGROUND

Medical imaging provides a non-invasive method to visualize the internal structure of a patient. Visualization methods can be used to screen for and diagnose cancer and other maladies in a patient. For example, early screening can detect lesions within a breast that might be cancerous so that treatment can take place at an early stage in the disease.

Mammography is a form of medical imaging that utilizes x-ray radiation to visualize breast tissue. These techniques are often used to screen patients for potentially cancerous lesions and other abnormalities. Traditional mammograms involve acquiring two-dimensional (2D) images of the breast from various angles. A craniocaudal (CC) image is one of the standard image types captured with x-ray radiation. The CC image is a visualization of the breast from above (e.g., view from top of breast). Another standard image type is the mediolateral-oblique (MLO) image that images the breast from the side at an angle. Generally, MLO images are captured at an angle or at angles of forty to sixty degrees. The review and consideration of information in the CC images and in the MLO images together can increase the diagnostic power of breast imaging. Tomosynthesis is another method of taking mammograms, where a plurality of images are acquired. Each image is acquired at a respective thickness and the images are taken at a multitude of angles.

It is against this background that the present disclosure is made.

SUMMARY

In one aspect, the present disclosure relates to a method of correlating regions of interest (ROIs) in an image pair including a cranial-caudal (CC) image and a medial-lateral-oblique (MLO) image, the method including: receiving, by an ensemble matching machine learning (ML) model, data from a similarity matching ML model, the data from the similarity matching ML model including at least a matched pair of ROIs and a first confidence level indicator associated with the matched pair of ROIs; receiving, by the ensemble matching ML model, data from a geo-matching (GM) model, the data from the GM model including at least the matched pair of ROIs and a second confidence level indicator; determining, by the ensemble matching ML model, a joint probability of correlation based on evaluation of each of the first and second confidence level by the ensemble matching ML model, wherein the joint probability of correlation provides a probability that the ROI in the CC image correlates to the corresponding ROI in the MLO image and vice versa; and providing the joint probability of correlation to an output device. In an example, the method further includes receiving data associated with training CC-MLO image pairs; and training the ensemble matching ML model with the data associated with the training CC-MLO image pairs.

In another example of the above aspect, the method further includes determining, by the ensemble matching ML model, a third confidence level indicator based on evaluation of each of the first and second confidence level and the joint probability of correlation, wherein the third confidence level indicator is a likelihood of reliability associated with the joint probability of correlation. In another example, the joint probability is a probability that the similarity correlation and the GM correlation properly correlated the CC-ROI and the MLO-ROI. In still another example, providing the joint probability of correlation to an output device comprises a numerical value associated with the joint probability of correlation.

In another example, each image of the matched lesion pair is a whole breast image. In yet another example, each image of the matched lesion pair contains only the ROI for each of the CC image and the MLO image. In still another example, providing the joint probability of correlation to an output device comprises a numerical display. In another example of the above aspect, providing the joint probability of correlation to an output device includes: receiving a selection of the CC-ROI; and presenting, in response to receiving the selection of the CC-ROI, the MLO-ROI. In a further example, the method further includes determining, in response to receiving the selection of the CC-ROI, that the joint probably of correlation exceeds a predetermined threshold; and presenting, in response to determining that the joint probability of correlation exceeds a predetermined threshold, the MLO-ROI.

In another example of the above aspect, the matched pair of ROIs includes a similarity correlation between a CC-ROI in a CC-image and a MLO-ROI in a MLO image, wherein the first confidence level indicator is a probability associated with the correlation between the CC-ROI and the MLO-ROI. In another example, the second confidence level indicator is a probability associated with a GM correlation between the CC-ROI and the MLO-ROI. In still another example, the method further includes displaying, on the output display, a pair of symbols, wherein each symbol of the pair of symbols marks a ROI of the matched pair of ROIs. In another example, the data from the GM model comprises location data for each ROI of the matched pair of ROIs. In a further example, the second confidence level indicator indicates a probability that a first location of a first ROI of the matched pair of ROIs and a second location of a second ROI of the matched pair of ROIS are a same location. In a still further example, each of the CC image and the MLO image depicts a breast and the GM model logically divides the breast into quadrants.

In another example of the above aspect, the data from the similarity model comprises characteristics data for each ROI of the matched pair of ROIs. In another example, the first confidence level indicator indicates a degree of similarity between a first set of characteristics associated with a first ROI of the matched pair of ROI and a second set of characteristics associated with a second ROI of the matched pair of ROIs. In a further example, the characteristics data includes one or more of a size, a shape, one or more margins, a location, a density, one or more colors, an orientation, a texture, a pattern, and a depth.

In another aspect, the present disclosure relates to a system for ensemble matching a cranial-caudal (CC) and a medial-lateral-oblique (MLO) image including: at least one processor in communication with at least one memory; an ensemble matching module that executes on the at least one processor and during operation is configured to: receive, from a similarity matching model, a matched CC-MLO image pair and a similarity confidence level indicator associated with the matched CC-MLO image pair; receive, from a geometric matching (GM) model, the matched CC-MLO image pair and a GM confidence level indicator associated with the matched CC-MLO image pair; apply an ensemble matching model to determine an ensemble confidence level based on an ensemble machine learning (ML) algorithm trained on a plurality of matched CC-MLO pairs; associate the ensemble confidence level with the matched CC-MLO image pair; and output the ensemble confidence level with the matched CC-MLO image pair. In an example of this aspect, the system further includes an image acquisition module.

In another example of the above aspect, the matched CC-MLO image pair comprises a first region of interest (ROI) identified in the CC image and a second ROI identified in the MLO image, wherein either of the similarity ML model or the GM model assigns a correlation to the first ROI and the second ROI. In a further example, the ensemble matching module further receives, from the GM model, location data associated with the correlation between the first ROI and the second ROI. In another further example, the ensemble matching module further receives, from the similarity ML model, shape data associated with the correlation between the first ROI and the second ROI. In a still further example, the ensemble matching module further receives, from the similarity ML model, margin data associated with the correlation between the first ROI and the second ROI. In a yet further example, the similarity matching model determines the matched CC-MLO image pair by: identifying a CC region of interest (ROI) in a CC-image received from an image acquisition module; searching an MLO image received from the image acquisition module for a MLO-ROI, wherein the MLO image includes plurality of regions and the similarity matching model review each region of the plurality of regions; determining at least one similarity characteristic of each of the CC-ROI and the MLO-ROI; and correlating the CC-ROI and the MLO-ROI based on the at least one similarity characteristic.

BRIEF DESCRIPTION OF THE DRAWINGS

FIGS. 7A-7C illustrate CC-MLO image pairs showing soft tissue lesions;

DETAILED DESCRIPTION

Figure 1:
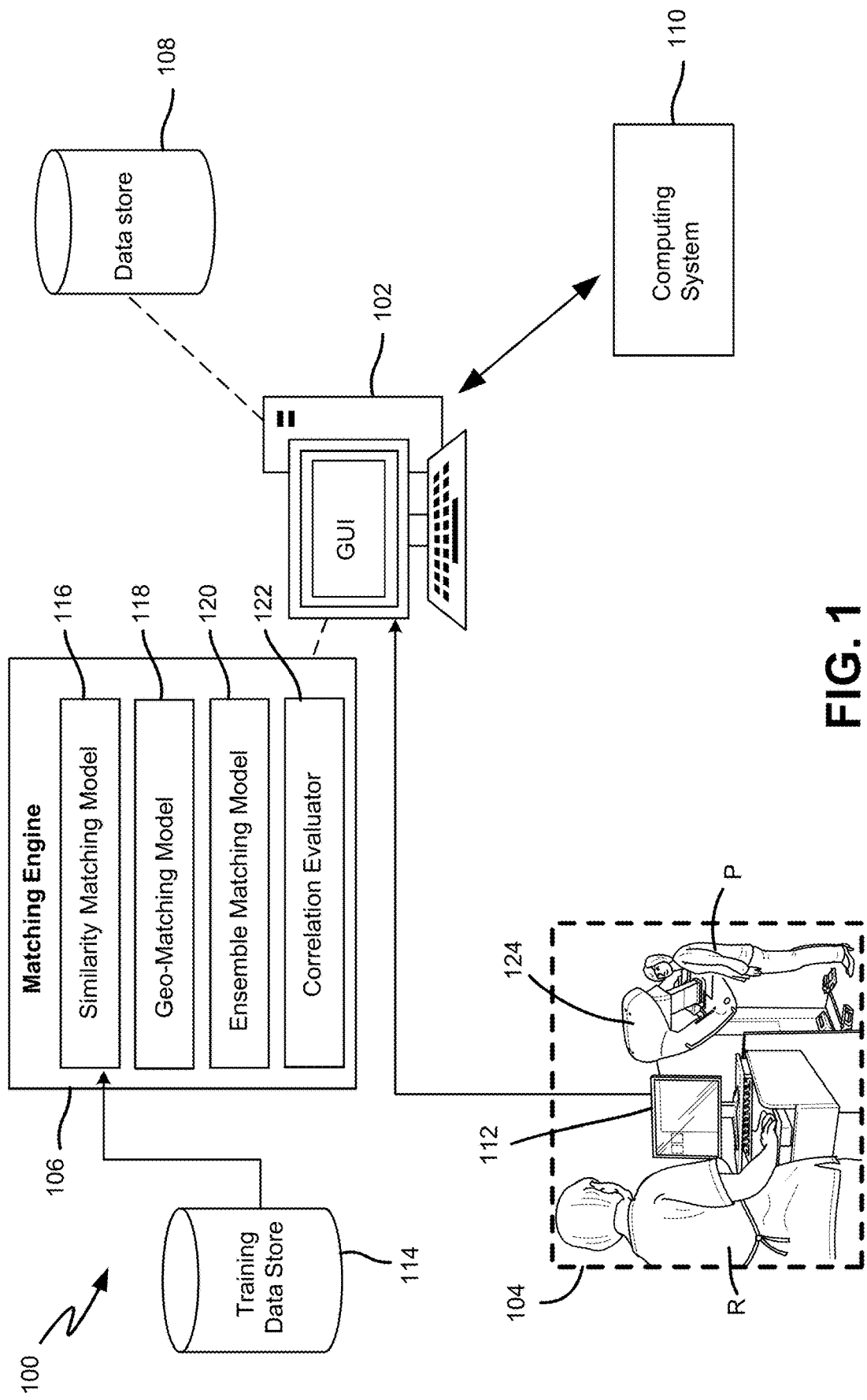
FIG. 1 illustrates an example system for detecting a region of interest within a breast.

The present disclosure is directed to systems and methods for locating lesions within breast tissue using an imaging device. In particular, a computing system utilizes machine learning (ML) models or artificial intelligence (AI) models to navigate to a first lesion in an image of a first image type, to navigate to a second lesion in an image of a second image type, and to correlate the first lesion and the second lesion. In correlating the first lesion and the second lesion, the computing system determines that the first lesion and the second lesion are the same object within the tissue of a breast. In one embodiment, the first image type is a cranial-caudal (CC) image and the second image type is a medio-lateral oblique (MLO) image. As discussed herein, an image type refers to a perspective view from which an image is taken in addition to other features, e.g., a modality with which an image is taken. The term "lesion" refers to any object of interest, such as a mass, one or more calcifications, and other suspicious areas.

In examples, systems and method embodying the present disclosure identify a first region of interest (ROI) in an image of a first image type, identify a second ROI in an image of a second image type, and correlate the first ROI to the second ROI. An ROI may contain one or more lesions. The image of the first image type may include multiple lesions. Similarly, the image of the second image type may include multiple lesions. While examples discussed in greater detail herein are primarily directed to mammograms, it will be understood by those of skill in the art that the principles of the present disclosure are applicable to other forms of breast imaging, such as tomosynthesis, ultrasound, and magnetic resonance imaging, as well as to the use of medical imaging on other structures of the body.

Generally, a computing system operates to correlate a first lesion in an image of a first image type and a second lesion in an image of a second image type, and to provide a confidence level indicator. A correlation is a determination by the system that the first and second lesion each represent a same object within the breast. The confidence level indicator indicates a level of confidence in the correlation between the first lesion and the second lesion. The confidence level indicator represents a likelihood that the determination that the first and second lesion represent a same object within the breast was reliably determined. The computing system uses one or more ML models to analyze the image of the first image type and the image of the second image type to determine if the first lesion in the image of the first image type correlates with the second lesion in the image of the second image type. The confidence level indicator may also be generally understood as a confidence score.

In an example implementation, a confidence level indicator is presented on a display. The confidence level indicator is provided to a radiologist to aid the radiologist in determining whether the first lesion in the first image type is correlated with the second lesion of the second image type. When the system determines that the first lesion in the first image type is correlated with the second lesion in the second image type, this indicates that the first and second lesion are different views of the same object within the breast of a patient. In some examples, one or more of a similarity matching ML model, a geo-matching ML model, and an ensemble matching ML model is used.

FIG. 1 illustrates an example identification system 100 for locating a lesion within a breast using imaging of one or more types, and for correlating a first lesion in a first image type with a second lesion of a second image type. The identification system 100 includes a computing system 102 and an x-ray imaging system 104. In some examples, the identification system 100 operates to guide a radiologist to a lesion in a breast, based on data collected during an x-ray imaging procedure when the lesion was first identified. In some examples, the identification system 100 provides a confidence level indicator to the radiologist to aid the radiologist in confirming that a first lesion visible in an image of a first image type is correlated with a second lesion identified in an image of a second image type. In embodiments, the confidence level indicator is presented on a display.

The x-ray imaging system 104 operates to take images of breast tissue using x-ray radiation. The x-ray imaging system 104 includes an x-ray imaging device 124 and the x-ray computing device 112 in communication with the x-ray imaging device 124. The x-ray imaging device 124 is described in further detail in relation to FIGS. 2-4. The x-ray computing device 112 operates to receive inputs from a radiologist (R) to operate the x-ray imaging device 124 and view images received from the x-ray imaging device 124.

A radiologist R operates the x-ray computing device 112 to capture x-ray images of the breast of a patient (P) using the x-ray imaging device 124. The x-ray images typically including CC and MLO images for each breast (LMLO, RMLO and RCC, LCC) as well as others. The x-ray images may be taken as part of a routine health screening or as part of a diagnostic examination.

For each image type (CC, MLO, etc.) the images may be acquired as a plurality of projections (Tp) at different angles and thicknesses. The plurality of image may be processed or reconstructed to produce a plurality of reconstructed images or slices (Tr). The plurality of Tr images may be synthesized into a single synthesized image (Ms) showing the most relevant clinical information and ROI locations. Each of the pixels in the synthesized image Ms may be mapped to a Tr image or slice. Each of the CC image and the MLO image may be one or more tomosynthesis image slices or Tr images. In embodiments, one or more of the CC image and the MLO image may be a Tp projection image.

In embodiments, each of Ms, Tr, and Tp images may be stored in the data store and can be retrieved by a radiologist for review. The images are then presented to a radiologist R who reidentifies one or more lesions in the patient P's breast that may require additional analysis to determine if the lesions are potentially cancerous and require a biopsy.

The computing system 102 operates to process and store information received from the x-ray imaging system 104. In the example of FIG. 1, the computing system 102 includes a matching engine 106 and a data store 108. In some examples, the matching engine 106 and data store 108 are housed within the memory of the computing system 102 (e.g., memory 1408 in FIG. 14). In some examples, the computing system 102 accesses the matching engine 106 and data store 108 from a remote computing system 110 such as a cloud computing environment. Though FIG. 1 shows the computing system 102 as standing alone from other components of the identification system 100, the computing system 102 may also be incorporated into the x-ray computing device 112 or another computing device utilized in patient care. In some examples, the computing system 102 includes two or more computing devices.

A radiologist R will typically review a plurality of CC tomosynthesis images and a plurality of MLO tomosynthesis images for each breast. Particularly, the radiologist will visually review the plurality of images to locate a region of interest in one of the CC images and try to find a similar region in one of the corresponding MLO images. However, this process is imperfect and subject to human error because no known technology exists that can find related artifacts across different types of images.

The matching engine 106 is programmed to analyze images of different types to determine if a first lesion in a first image of a first image type is a same object as a second lesion in a second image of a second image type. Matching engine 106 includes one or more machine learning (ML) modules 116, 118, 120. Matching engine 106 represents logic or programming which operates on a processor in computer system 102, such as processing device 1402 in FIG. 14. In embodiments, matching engine further includes a correlation evaluator 122.

In the example of FIG. 1, a training data store 114 is utilized to train ML models 116, 118, 120. The training data store 114 stores multiple training cases of correlated first and second lesions in images of the first and the second image types, where the first and second lesions have been correlated by a matching engine or by a human. In embodiments, each training case that is stored in training data store 114 includes at least a pair of images (also referred to simply as "image pairs") of the first image type and second image type. Each image in a training image pair contains one or more of an ROI, a confirmed lesion, or a potential lesion. A first lesion in a first image in the training image pair is correlated to a second lesion in the second image of the training image pair. The first image is of a first image type and the second image is of a second image type. The stored training cases include training image pairs with correctly correlated lesions and, in embodiments, also include training image pairs with falsely correlated lesions.

Computer system 102 uses the stored training cases in training data store 114 to train ML models 116, 118, and 120 to identify features that can be used to correlate a first and second lesion in images of the first and the second image types. In one embodiment, each ML model 116, 118, 120 is a machine learning classifier. Once trained, ML models 116, 118, and 120 can be used by matching engine 106 to correlate lesions in images of different types.

Various machine learning techniques can be utilized to generate a machine learning classifier to be used as a lesion classifier. In some examples, the machine learning models are supervised machine learning models. In other examples, one or more of the machine learning models are unsupervised machine learning models. In some examples, the machine learning models are based on an artificial neural network. In some examples, the neural network is a deep neural network (DNN). In some examples, the machine learning models are a convolutional deep neural network (CNN). In some examples, an ensemble or combination of two or more networks are utilized to generate one or more of the image classifiers. In some examples, two or more machine learning models are utilized to generate features or feature sets from the training image pairs in training data store 114.

The resulting trained machine learning classifiers, ML models 116, 118, 120, are applied by a correlation evaluator 122. Correlation evaluator 122 compares image pairs (e.g., CC-MLO image pairs) including an image of a first type (e.g., a CC image) and an image of a second type (e.g., an MLO image), and applies one or more of ML models 116, 118, 120 to the CC-MLO image pair to determine whether a first lesion in the CC image of the image pair correlates to a second lesion in the MLO image of the image pair. Correlation evaluator 122 determines a first and second lesion are correlated when the first lesion identified in the CC image is determined to be the same object as the second lesion identified in the MLO image base on ML models 116, 118, 120. Correlation evaluator 122 determines and outputs a confidence level indicator indicating a level of confidence in the correlation. In embodiments, correlation evaluator 122 is absent and the confidence level indicator is determined by matching engine 106 through the application of one or more of ML models 116, 118, 120 without correlation evaluator 122.

In one example, the confidence level indicator is a numerical value. In another example, the confidence level indicator may indicate a category of confidence such as "high," "medium," or "low." In alternative examples, the confidence level indicator is provided as a percentage such as "99%," "75%," or "44%". In examples, the confidence level indicator indicates a likelihood that a correlation has correctly determined that the first and second lesion are a same object.

In embodiments, the confidence level indicator includes two parts: a first confidence level indicator indicating a level of confidence in the correlation and a second confidence level indicator indicating a level of confidence in the calculation of the first confidence level indicator. For example, systems embodying the present disclosure determine a first lesion in an image of a first image type is correlated with a second lesion in an image of a second image type. The system calculates the first confidence level indicator, which is a probability that the correlation between the first and second lesion is accurate. The system also determines a second confidence level indicator, which indicates a level confidence that the first confidence level indicator was properly calculated. In this example the first confidence level indicator is an assessment of the correlation between the first and second lesions, while the second confidence level indicator is an assessment of the calculation producing the first confidence level indicator.

A graphical user interface (GUI) presented on a display of the computing system 102 operates to present information to a radiologist or other clinician. In some examples, the GUI displays a confidence level indicator overlayed on one or more image pairs being reviewed by the radiologist. For example, the GUI presents a CC image and an MLO image displayed side by side with the confidence level indicator overlaying the image pair and indicating a level of confidence that a first lesion identified in the CC image is the same object as a second lesion identified in the MLO image. In another example, a radiologist indicates a region of interest in the CC image and, in response, a corresponding MLO image having a region of interest with a highest confidence level of correlation to the region of interest in the CC image is brought up on the display. In embodiments, the corresponding MLO image has an indicator or is zoomed to the correlated region of interest.

Additionally or alternatively, the information displayed may include data such as a basis or a reason for the value of the confidence level indicator, or logic indicating why the matching engine 106 determined a particular value for the confidence level indicator. For example, coordinating location data from the geo-matching model 118 or shared shaped characteristics data from the similarity matching model 116 may be displayed. In embodiments, the confidence level indicator may be displayed on a synthesized or Ms image. Additionally, the GUI may display a letter or other symbol indicia, indicating that the first lesion in the CC image is correlated to the second lesion in the MLO image. For example, the first lesion in the CC image and the correlated second lesion in the MLO image is labeled with an "A." If multiple regions of interest appear in the image pair, multiple letters or labels may be used. In embodiments, the letter or other symbol indicia is displayed in addition to the confidence level indicator.

The data store 108 operates to store information received from the x-ray imaging system 104 and matching engine 106. In some examples, the data store 108 is actually two or more separate data stores. For example, one data store could be a remote data store that stores images from one or more x-ray imaging systems, such as x-ray imaging system 104. Another data store could be housed locally within the computing system 102. In some examples, the data store 108 may be part of an electronic medical record (EMR) system.

Figure 2:
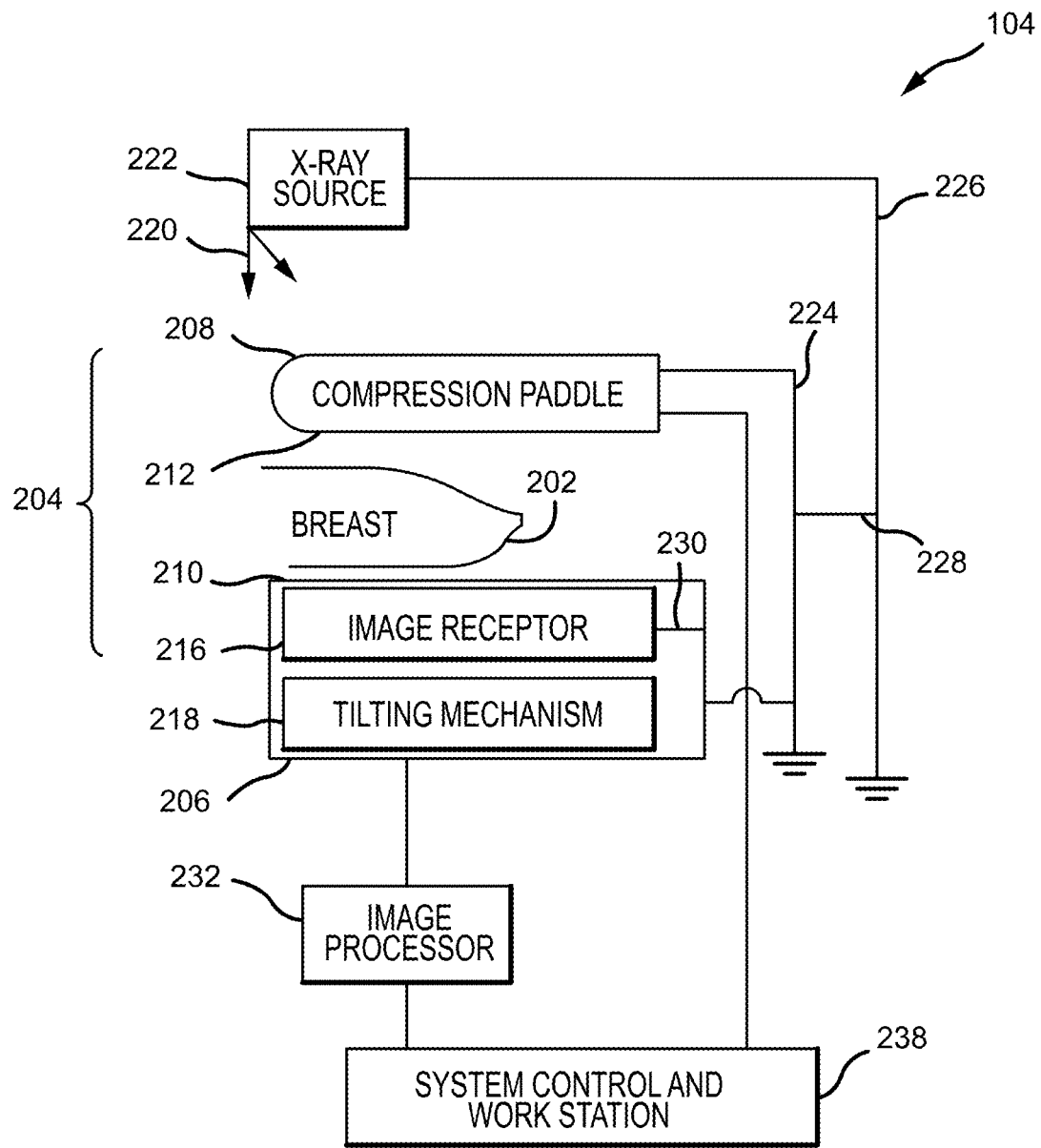
FIG. 2 illustrates an example x-ray imaging system.
Figure 3:
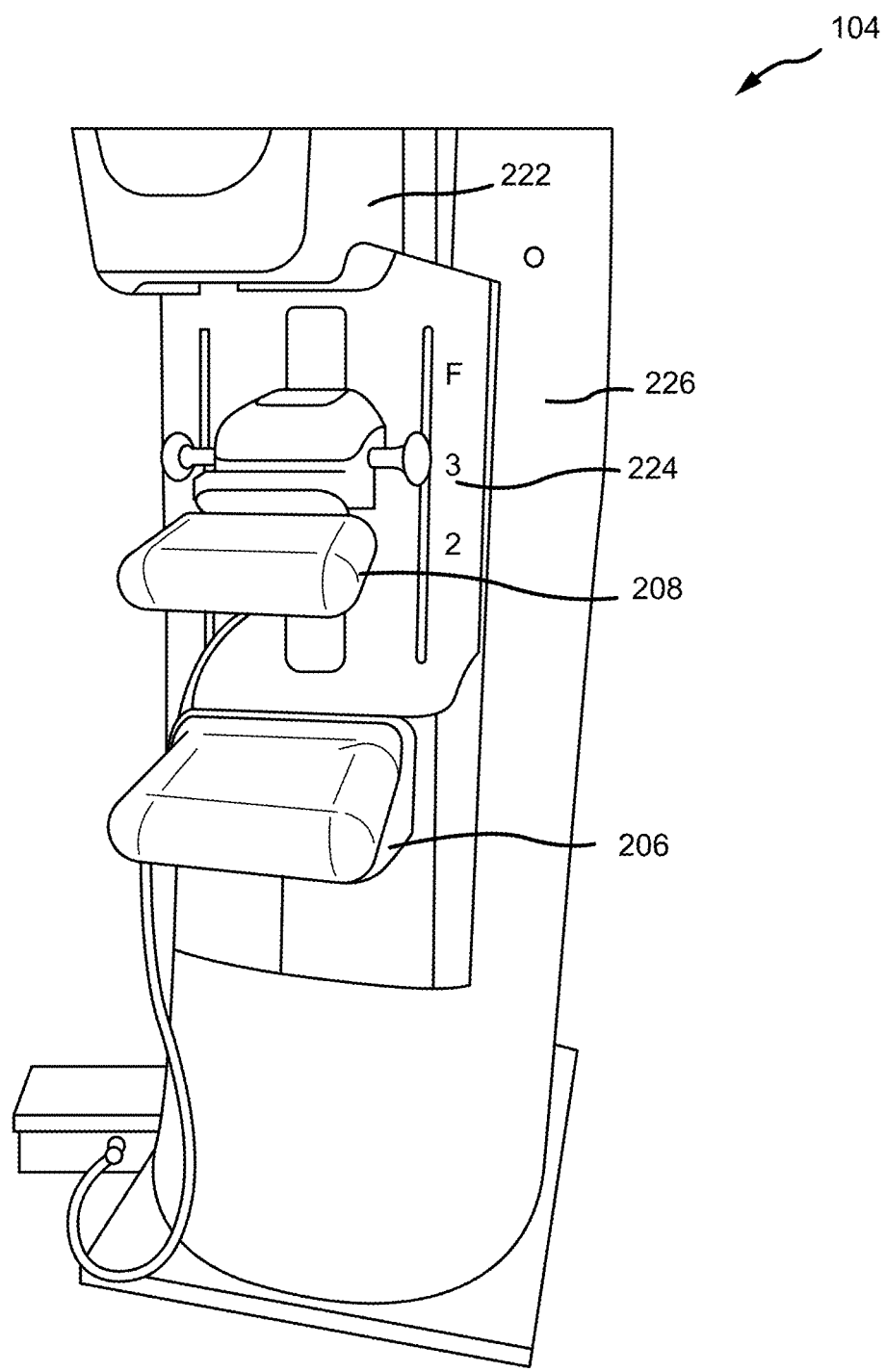
FIG. 3 illustrates a perspective view of the x-ray imaging system of FIG. 2.

FIG. 2 illustrates an example of the x-ray imaging system shown in FIG. 1. FIG. 3 illustrates a perspective view of the x-ray imaging system of FIG. 1. Referring concurrently to FIGS. 2 and 3, the x-ray imaging system 104 immobilizes a patient's breast 202 for x-ray imaging via a breast compression immobilizer unit 204 that includes a static breast support platform 206 and a moveable compression paddle 208. The breast support platform 206 and the compression paddle 208 each have a compression surface 210 and 212, respectively, that move towards each other to compress and immobilize the breast 202. In some systems, the compression surfaces 210, 212 are exposed so as to directly contact the breast 202. The breast support platform 206 also houses an image receptor 216 and, optionally, a tilting mechanism 218, and optionally an anti-scatter grid (not shown). The breast compression immobilizer unit 204 is in a path of an imaging beam 220 emanating from x-ray source 222, such that the imaging beam 220 impinges on the image receptor 216.

The breast compression immobilizer unit 204 is supported on a first support arm 224 and the x-ray source 222 is supported on a second support arm 226. For mammography, first and second support arms 224, 226 can rotate as a unit about an axis 228 between different imaging orientations such as CC and MLO, so that the x-ray imaging system 104 can take a mammogram projection image (x-ray image) at each orientation. In operation, the image receptor 216 remains in place relative to the breast support platform 206 while an image is taken. The breast compression immobilizer unit 204 releases the breast 202 for movement of first and second support arms 224, 226 to a different imaging orientation. For tomosynthesis, the first support arm 224 stays in place, with the breast 202 immobilized and remaining in place, while at least the second support arm 226 rotates the x-ray source 222, relative to the breast compression immobilizer unit 204 and the compressed breast 202, about the axis 228. The x-ray imaging system 104 takes plural tomosynthesis projection images of the breast 202 at respective angles of the imaging beam 220 relative to the breast 202.

Concurrently and optionally, the image receptor 216 may be tilted relative to the breast support platform 206 and in sync with the rotation of the second support arm 226. The tilting can be through the same angle as the rotation of the x-ray source 222 but may also be through a different angle selected such that the imaging beam 220 remains substantially in the same position on the image receptor 216 for each of the plural images. The tilting can be about an axis 230, which can but need not be in the image plane of the image receptor 216. The tilting mechanism 218 that is coupled to the image receptor 216 can drive the image receptor 216 in a tilting motion.

When the x-ray imaging system 104 is operated, the image receptor 216 produces imaging information in response to illumination by the imaging beam 220 and supplies it to an image processor 232 for processing and generating breast x-ray images. A system control and workstation unit 238 including software controls the operation of the system and interacts with the operator to receive commands and deliver information including processed-ray images.

Figure 4:
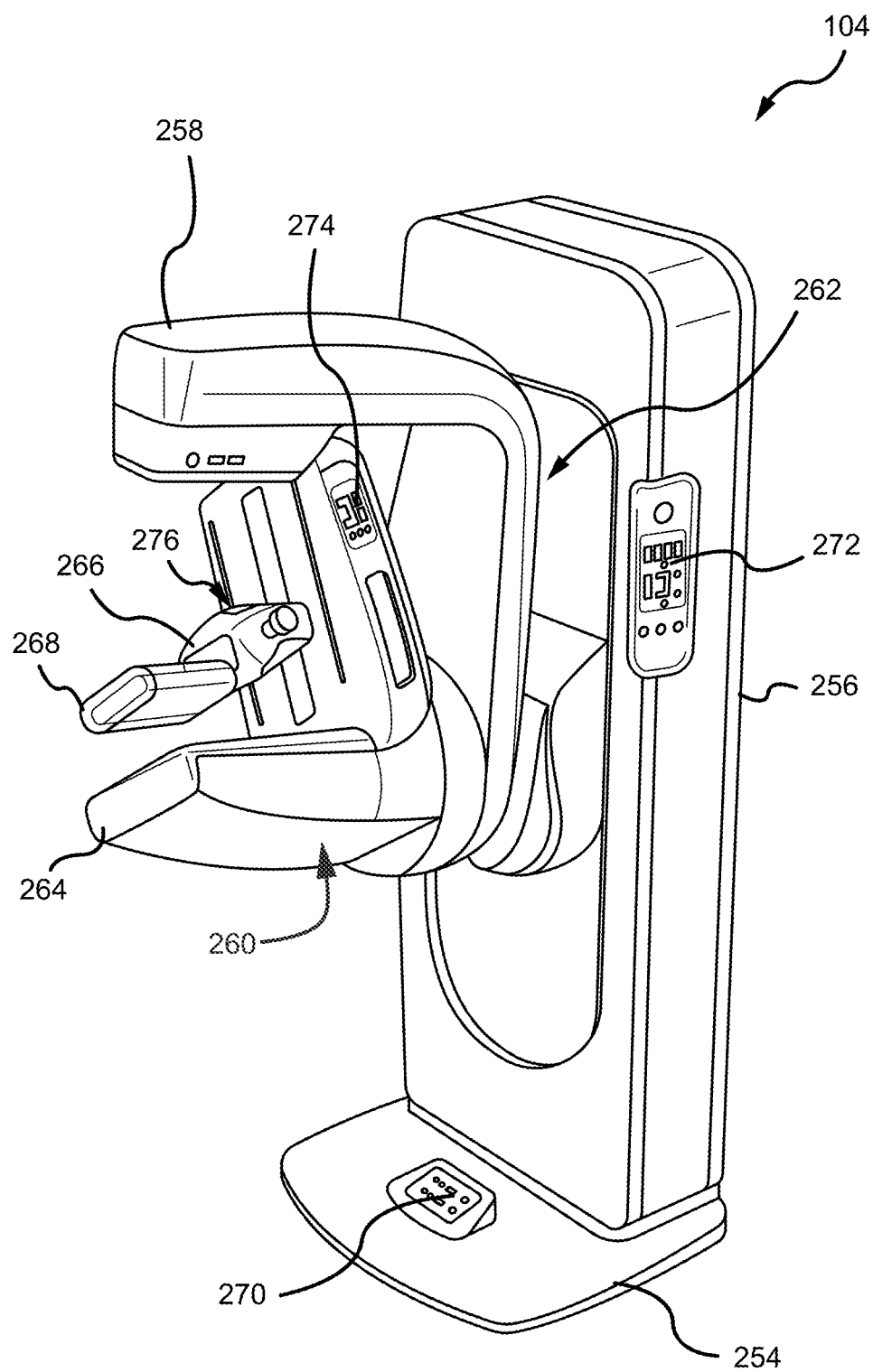
FIG. 4 illustrates the x-ray imaging system of FIG. 2 in a breast positioning state for left mediolateral oblique (LMLO) imaging orientation.

FIG. 4 illustrates the x-ray imaging system shown in FIG. 1 in a breast positioning state for left MLO (LMLO) imaging orientation. A tube head 258 of the x-ray imaging system 104 is set in an orientation so as to be generally parallel to a gantry 256 of the x-ray imaging system 104, or otherwise not normal to the flat portion of a support arm 260 against which the breast is placed. In this position, the technologist may more easily position the breast without having to duck or crouch below the tube head 258.

The x-ray imaging system 104 includes a floor mount or base 254 for supporting the x-ray imaging system 104 on a floor. The gantry 256 extends upwards from the floor mount 252 and rotatably supports both the tube head 258 and a support arm 260. The tube head 258 and support arm 260 are configured to rotate discretely from each other and may also be raised and lowered along a face 262 of the gantry so as to accommodate patients of different heights. An x-ray source, described elsewhere herein and not shown here, is disposed within the tube head 258. The support arm 260 includes a support platform 264 that includes therein an x-ray receptor and other components (not shown). A compression arm 266 extends from the support arm 260 and is configured to raise and lower linearly (relative to the support arm 260) a compression paddle 268 for compression of a patient breast during imaging procedures. Together, the tube head 258 and support arm 260 may be referred to as a C-arm.

A number of interfaces and display screens are disposed on the x-ray imaging system 104. These include a foot display screen 270, a gantry interface 272, a support arm interface 274, and a compression arm interface 276. In general, the various interfaces 272, 274, and 276 may include one or more tactile buttons, knobs, switches, as well as one or more display screens, including capacitive touch screens with graphic user interfaces (GUIs) so as to enable user interaction with and control of the x-ray imaging system 104. In examples, the interfaces 272, 274, 276 may include control functionality that may also be available on a system control and workstation, such as the x-ray computing device 112 of FIG. 1. Any individual interface 272, 274, 276 may include functionality available on other interfaces 272, 274, 276, either continually or selectively, based at least in part on predetermined settings, user preferences, or operational requirements. In general, and as described below, the foot display screen 270 is primarily a display screen, though a capacitive touch screen might be utilized if required or desired.

In examples, the gantry interface 272 may enable functionality such as: selection of the imaging orientation, display of patient information, adjustment of the support arm elevation or support arm angles (tilt or rotation), safety features, etc. In examples, the support arm interface 274 may enable functionality such as adjustment of the support arm elevation or support arm angles (tilt or rotation), adjustment of the compression arm elevation, safety features, etc. In examples, the compression arm interface 276 may enable functionality such as adjustment of the compression arm elevation, safety features, etc. Further, one or more displays associated with the compression arm interface 276 may display more detailed information such as compression arm force applied, imaging orientation selected, patient information, support arm elevation or angle settings, etc. The foot display screen 270 may also display information such as displayed by the display(s) of the compression arm interface 276, or additional or different information, as required or desired for a particular application.

As described earlier, a CC-MLO image pair, taken, for example, by x-ray imaging system 104, is analyzed to determine a correlation between a first lesion in the CC image and a second lesion in the MLO image. The CC-MLO image pair is analyzed by a matching engine using one or more ML models. The machine learning models include one or more of a similarity matching ML model, a geo-matching ML model, and an ensemble ML matching model (e.g., ML models 116, 118, 120 in FIG. 1).

When applying the similarity matching ML model, the matching engine compares the first and second lesions to determine a confidence level indicator that represents how similar in appearance or location the first and second lesions are to each other. The similarity matching ML model provides criteria to determine the similarity of two or more lesions based on factors or features such as shape, margin, proximity or relationship to anatomical landmarks or other notable features in the image, etc. . . . The similarity matching ML model may be a neural network and, in embodiments, is a feature-based network. The neural network may be a fully connected network. In examples, the similarity matching ML model is a deep learning neural network, such as a deep convolutional network.

When applying the geo-matching ML model, the matching engine maps the first and second lesions in each of a first image (e.g., a CC image) and a second image (e.g., a MLO image) based on one or more criteria to determine if the first lesion is a same object as the second lesion. In one embodiment, the criteria include a distance between a lesion and one or more identifiable physical or anatomical landmarks. The anatomical landmarks include, but are not limited to, the nipple, the chest wall, and the pectoral muscle. In embodiments, the criteria include a probability that a lesion is located in a particular quadrant of the image or the volume being imaged (e.g., a breast). The geo-matching ML model may be a neural network or other ML model. In embodiments the geo-matching model is a rule-based AI.

When applying the ensemble matching model, the matching engine compares correlation data received from other models in the system, such as similarity matching model 116 and geo-matching model 118, and determines and outputs a joint probability of correlation. In examples, the ensemble matching model may be a feature-based neural network. The ensemble matching model may generate features related not only to the lesions in the different image types, but features related to data received from other matching models in the system. For example, data or confidence level indicators produced by other ML models may be a feature in the ensemble matching model.

Figure 5:
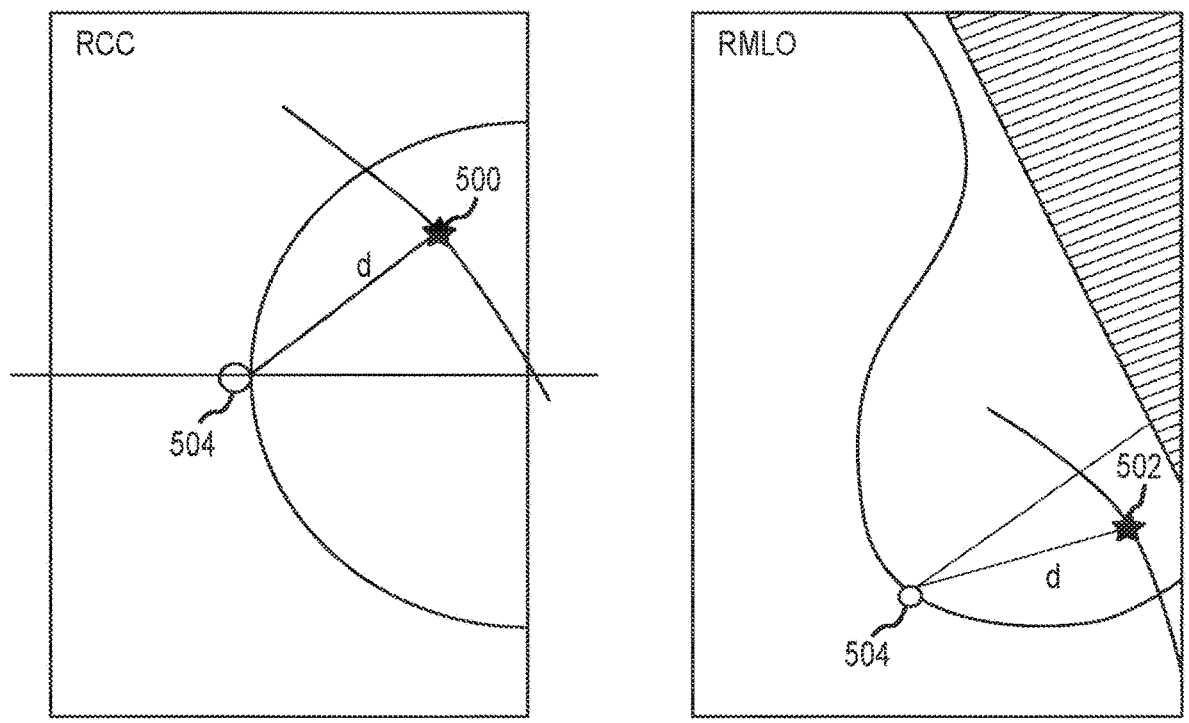
FIG. 5 illustrates a technique for geo-matching using a distance between the nipple and a lesion in a CC image.

FIG. 5 illustrates a technique for geo-matching using a distance between the nipple and a first or second lesion in an image pair. In one embodiment, a first lesion 500 in a CC image of the right breast (RCC) is identified. The geo-matching ML model is applied to find the location of a second lesion 502 in an MLO image of the right breast (RMLO). The geo-matching ML model is used to calculate the distance (d) from the first lesion 500 to the nipple 504. An arc is superimposed on the RMLO image having a radius that is equal to the distance (d). Once the second lesion 502 is identified in the RMLO image, the geo-matching ML model is applied to determine a confidence level indicator (e.g., a probability) that the second lesion 502 in the RMLO image is the same object as the first lesion 500 in the RCC image. In other embodiments, different or additional anatomical landmarks may be used in geo-matching the target lesions.

Figure 6:
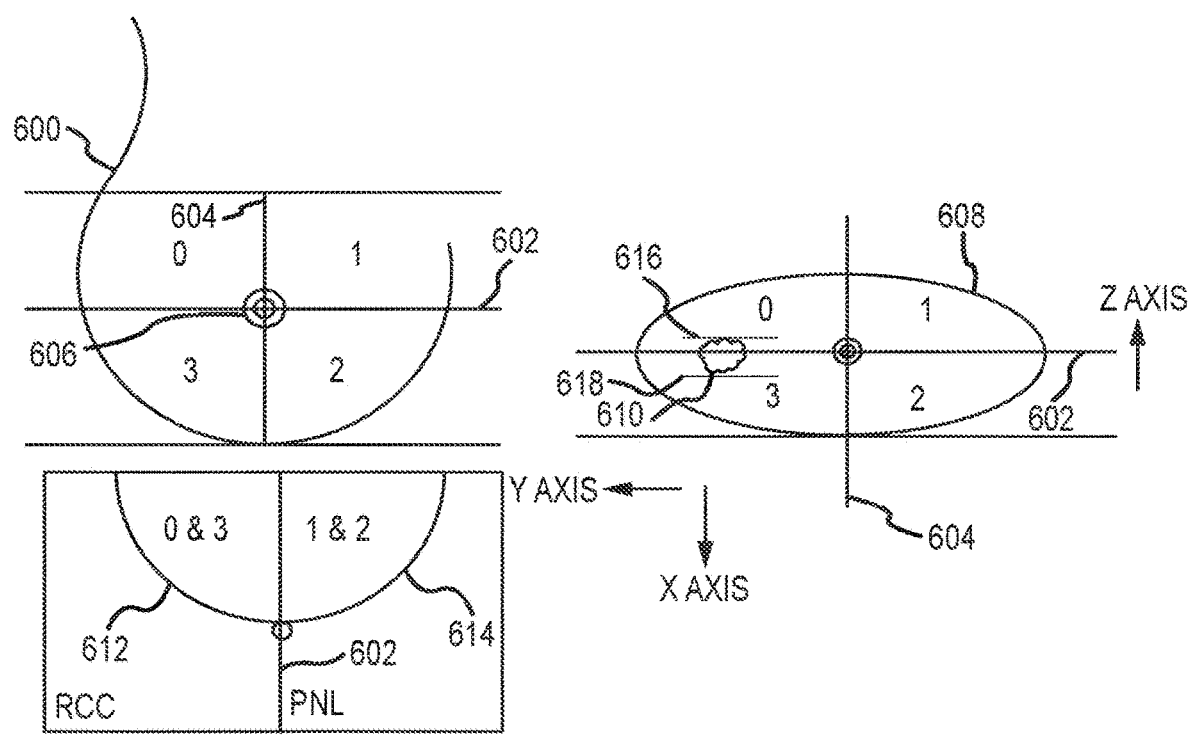
FIG. 6 illustrates a quadrant technique that can be used by the geo-matching ML model.

FIG. 6 illustrates a quadrant technique that can be used when applying the geo-matching ML model. The quadrant technique is used for quadrant-based matching of lesions. A breast 600 is viewed from the front of the breast. A horizontal line 602 and a vertical line 604 are superimposed on the breast 600 and intersect at the nipple 606. The intersecting horizontal and vertical lines 602, 604 logically divide the breast 600 into four quadrants (quadrants 0, 1, 2, and 3). In the RCC image, the vertical line 604 corresponds to the posterior nipple line (PNL). The PNL line is drawn posteriorly and perpendicularly from the nipple towards the pectoral muscle (or the posterior image edge in CC) in the CC images. In the RCC image, the quadrants 0 and 3 are combined into one half of the breast 612 and the quadrants 1 and 2 are combined into the other half of the breast 614.

As shown in the graphic representation 608 of the breast, a target lesion 610 extends into the quadrants 0 and 3. If the vertical line 604 represents an x axis and the horizontal line 602 represents a y axis of a cartesian coordinate system, a lesion 610 has a z max 616 in quadrant 0 and a z min 618 in quadrant 3. A geo-matching ML model is applied to estimate which quadrant a first lesion in a CC image is located in, to estimate which quadrant a second lesion in an MLO image is located in, and to compare the two estimated quadrants to determine if the estimated quadrants match. The geo-matching module can used to determine a confidence level indicator (e.g., a probability) that the first and second lesions in the CC and MLO images are the same lesion. In some embodiments, a probability map for the quadrants 0, 1, 2, 3 is determined and used with the geo-matching ML model to correlate a first lesion in a CC image with a second lesion in an MLO image.

In some instances, due at least in part to factors such as the density of the breast tissue, the positioning of the breast, the compression of the breast, or any motion of the breast tissue during the compression, the similarity matching technique or the geo-matching technique may be more suitable for correlating first and second lesions in the first and second image types.

FIGS. 7A-7C illustrate CC-MLO image pairs showing soft tissue lesions. In the CC-MLO image pairs 700, 702, 704, the CC image is the top image, and the MLO image is the bottom image. In the illustrated image pairs, either or both of the geo-matching and the similarity matching techniques may be effective at correlating the first soft tissue lesion in the CC image with the second soft tissue lesion in the MLO image in each CC-MLO image pair 700, 702, 704.

However, in an example, due to factors such as those listed earlier (e.g., motion of the breast tissue during compressions), the locations of some soft tissue lesions may shift between a first image type and a second image type, which can make it more challenging for the geo-matching technique to correlate the first and second soft tissue lesions across the first and second image types.

For example, due to the motion of the breast tissue, a first soft tissue lesion in a CC image may be estimated to be in one quadrant while a second soft tissue lesion in an MLO image can be estimated to be a different quadrant despite the first and second lesion in fact representing a same object in the breast. Since the soft tissue legions in the respective CC-MLO image pairs remain similar in one or more of the shape, the margins, the orientation, the density, the size, or the depth of the soft tissue lesion within the breast, despite factors such as movement during compression, the similarity matching technique can be more effective than the geo-matching technique in correlating the first and second soft tissue lesions in the CC-MLO image pairs in this example scenario.

Figure 8C:
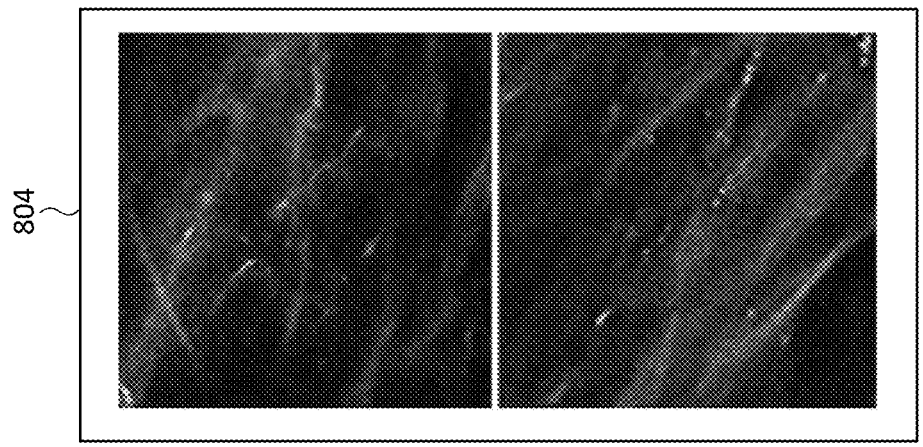
FIGS. 8A-8C illustrate CC-MLO image pairs showing calcification clusters.
Figure 8B:
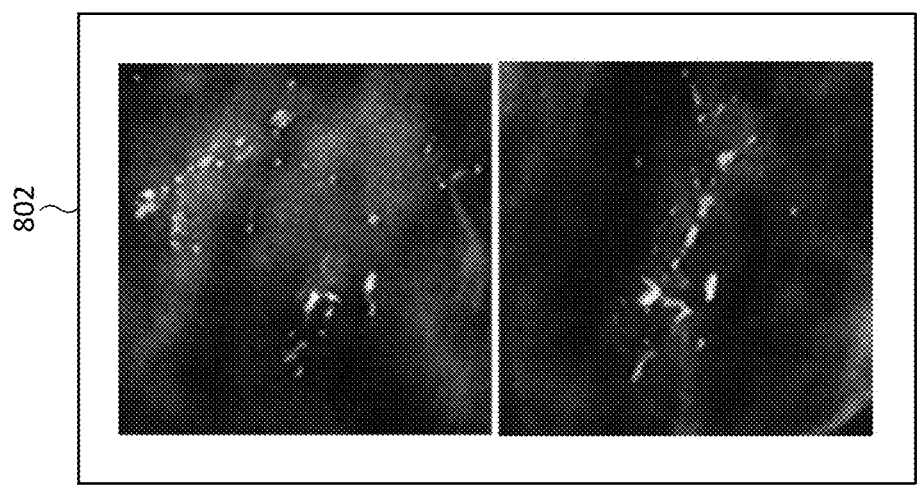
Figure 8A:
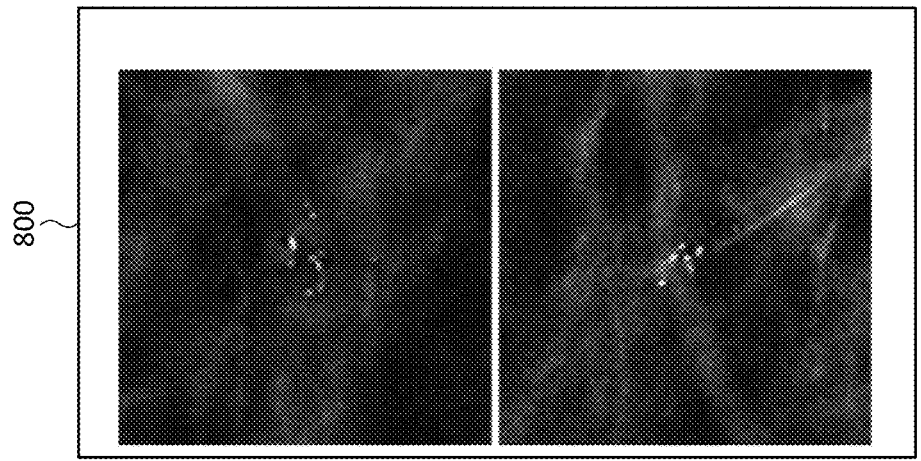

In contrast, a geo-matching technique can be more suitable for correlating first and second lesions like those seen the example CC-MLO image pairs 800, 802, 804 shown in FIGS. 8A-8C, where each CC-MLO image pair 800, 802, 804 depicts a cluster of calcifications. Each cluster of calcifications includes multiple calcifications that can vary in shape, margins, orientation, density, or size within the breast and across images of different types. Since the CC image and the MLO image are captured at different angles, it can be challenging to correlate the cluster of calcifications in the CC image with the cluster of calcifications in the MLO image using the similarity matching technique. As shown in FIGS. 8A-8C, the clusters can look very different when projected into different planes due to the motion among the calcium elements that form the cluster. It may be challenging for the similarity matching model to identify the cluster in the MLO image is the same object as the cluster in the CC image. Thus, the geo-matching technique can be more effective in correlating the first and second lesion in the CC-MLO image pair with each other in this example scenario where each lesion is a cluster of calcifications.

Based at least on the different strengths and effectiveness between the similarity matching technique and the geo-matching technique, embodiments disclosed herein use an ensemble matching technique to correlate first and second lesions in CC and MLO image pairs (e.g., the ensemble matching ML model 120 in FIG. 1). The ensemble matching technique operates on all types of lesions and improves the effectiveness of the correlation process. In some instances, embodiments that employ the ensemble matching technique can improve the correlation process by more than ninety percent.

Figure 9:
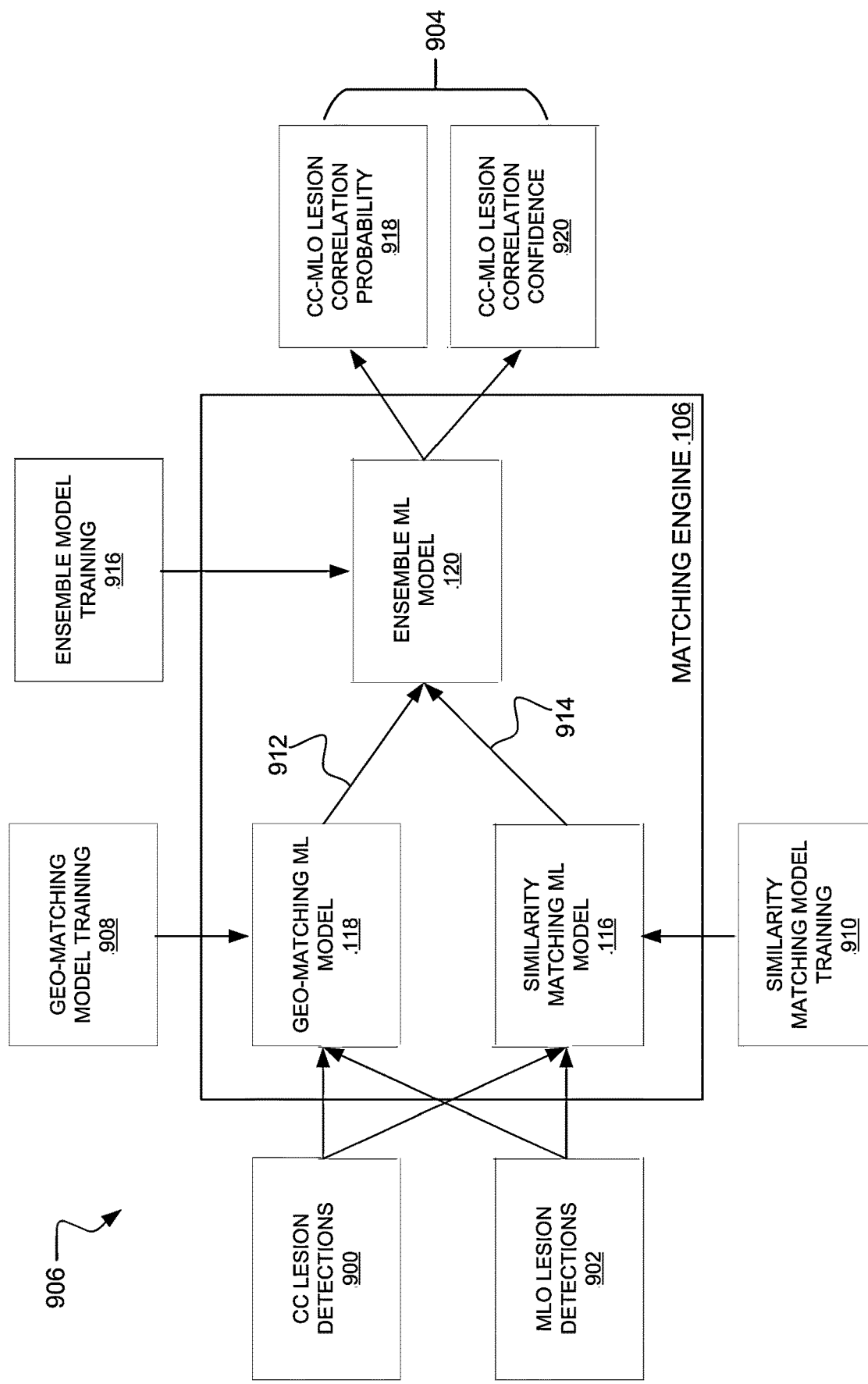
FIG. 9 illustrates a process flow for processing a CC-MLO image pair.

FIG. 9 illustrates a process flow 906 for processing a CC-MLO image pair. In one embodiment, a CC-MLO image pair 900, 902 is received by matching engine 106 and geo-matching ML model 118 is applied to the CC-MLO image pair 900, 902. Geo-matching ML model 118 previously received geo-matching model training 908. Geo-matching model training 908 comprises training data for training the geo-matching ML model 118 and may be stored in a training data store, such as training data store 114 of FIG. 1. In embodiments, geo-matching model training 908 is a set of CC-MLO image pairs with correlated first and second lesions. Geo-matching model training 908 may include both true matched lesions, that demonstrate accurate correlations, and false matched lesions, that demonstrate inaccurate correlations. In embodiments, such as embodiments where geo-matching ML model 118 is instead a rules-based AI, geo-matching model training 908 is a set of geo-matching rules.

Using geo-matching ML model 118, matching engine 106 determines whether one or more lesions are present in CC-MLO image pair 900, 902 outputs results data 912, including a confidence level indicator, that a first lesion present in CC image 900 is correlated to a second lesion present in MLO image 902. Geo-matching ML model 118 is used to determine the results data 912 based on features or rules learned from geo-matching model training 908.

The similarity matching ML model 116 is applied to CC-MLO image pair 900, 902 by matching engine 106. Similarity matching ML model 116 previously received similarity matching model training 910. Similarity matching model training 910 comprises training data for training the similarity matching ML model 116 and may be stored in a training data store, such as training data store 114 of FIG. 1. In embodiments, similarity matching model training 910 is a set of CC-MLO image pairs with correlated lesions. Similarity matching model training 910 may include both true matched lesions, that demonstrate accurate correlations, and false matched lesions, that demonstrate inaccurate correlations. In embodiments, similarity matching model training 910 is a same data set as geo-matching model training 908. In embodiments, similarity matching model training 910 is a different data set than geo-matching model training 908.

Similarity matching ML model 116 is used to determine whether one or more lesions are present in CC image 900 and MLO image 902 and outputs results data 914, including a confidence level indicator, that a first lesion in CC image 900 is correlated to a second lesion in MLO image 902. Similarity matching ML model 116 is used to determine the results data 914 based on similarity matching model training 910. In examples, matching engine 106 executes similarity matching ML model 116 on similarity matching model training 910, for example to generate a feature set, and generates the results data 914 by applying the feature set to the CC-MLO image pair 900, 902.

Matching engine 106 applies ensemble ML model 102 to results data 912 from the geo-matching ML model 118 (e.g., a geo-matching confidence level indicator) and results data 914 from the similarity matching ML model 116 (e.g., a similarity confidence level indicator). In embodiments, ensemble matching ML model 120 is also employed to analyze CC-MLO image pair 900, 902 directly.

Ensemble matching ML model 120 may be applied to CC-MLO image pair 900, 902 as output data from one or both of geo-matching ML model 118 and similarity matching ML model 116. For example, results data 912 from geo-matching ML model 118 may include the CC-MLO image pair annotated to show quadrants or other location data used to calculate the geo-matching confidence level indicator. Results data 914 from similarity matching ML model 116 may include the CC-MLO image pair annotated to show shape or margin data for the first and second lesions. Ensemble matching ML model 120 may be applied to CC-MLO image pair 900, 902 independently of either geo-matching ML model 118 and similarity matching ML model 116.

Results data 912, 914 generally includes a geo-matching confidence level from geo-matching ML model 118 and a similarity confidence level from similarity matching ML model 116. In embodiments, results data 912, 914 comprise additional data from one or both of geo-matching ML model 118 and similarity matching ML model 116. For example, geo-matching results data 912 from geo-matching ML model 118 may also include a distance between a lesion and an anatomical landmark for each of CC image 900 and MLO image 902, or may include quadrant estimations for each of a first lesion in CC image 900 and a second lesion in MLO image 902. Similarity results data 914 from similarity matching ML model 116 may include similarity data, such as shape, texture, orientation, or margin.

Matching engine 106 uses ensemble ML model 120 to evaluate the CC and MLO images 900, 902 with the results data 912, 914 from the geo-matching and similarity matching ML models 118, 116 and produces a joint probability of correlation 904 that represents the probability that the first and second lesions in the CC and MLO image pair are the same object within the breast. Joint probability of correlation 904 may be a single value representing a probability that the correlation of a first and second lesion between the CC image 900 and the MLO image 902 is a reliable correlation. In examples, joint probability of correlation 904 includes at least two elements: a correlation probability 918 that represents the likelihood that the correlation is reliable, and a correlation confidence level 920 which represents a likelihood that the probability calculation itself is reliable.

Ensemble ML model 120, prior to receiving results data 912, 914, is trained using ensemble model training 916. Ensemble model training 916 comprises training data for training the ensemble matching ML model 120 and may be stored in a training data store, such as training data store 114 of FIG. 1. In embodiments, ensemble model training 916 is a set of CC-MLO image pairs with correlated first and second lesions. Ensemble model training 916 may include both true matched lesions and false matched lesions. In embodiments, ensemble model training 916 is a same data set as geo-matching model training 908 and similarity matching model training 910. In embodiments, ensemble model training 916 is a different data set from one or both of geo-matching model training 908 and similarity matching model training 910.

Regardless of whether ensemble model training 916 is a same or different data set as compared to training data received by other models in the system, ensemble ML model 120 generates a unique feature set. Ensemble ML model 120 develops a feature set that includes features related to images, lesions, and other ROIs, and also includes features related to results data 912, 914, such as scoring, confidence level, location data, shape data, margin data, etc.

Ensemble ML model 116 is used by matching engine 106 to determine how reliable the correlations made using geo-matching ML model 118 and similarity matching ML model 116 are, and presents this reliability determination as a joint probability of correlation 904. Joint probability of correlation 904 may be a single output, such a numerical probability or color-coded confidence level indicator, or may have two or more parts. The example process flow 906 presents the joint probability of correlation as a correlation probability 918 and an associated correlation confidence level 920.

To consider an example case, a particular first and second lesion may be of a kind for which geo-matching is more effective, e.g., a cluster of calcifications. The ensemble matching ML model may be trained to identify when the target lesion is a calcification and to place a greater weight on data received from the geo-matching ML model in such a case. However, in this example scenario, the cluster of calcifications may be located on a boundary between two or more quadrants. The ensemble matching ML model may also be trained to reduce confidence in the geo-matching ML model is this situation where a lesion crosses over a quadrant boundary, as this prevents the lesion from being accurately estimated as being in one quadrant or the other. In this scenario, both the geo-matching ML model and similarity matching ML model may determine high likelihood of correlation, which would result in a high correlation probability. However, because confidence in the similarity matching ML model is reduced due to the type of lesion and confidence in the geo-matching ML model is reduced due to the location of the lesion on a quadrant boundary, the high correlation probability is accompanied by a low correlation confidence level.

Ensemble ML model 120 is trained to determine the joint probability of correlation 904 based on ensemble model training 916. In examples, ensemble ML model 120 executes a ML algorithm on ensemble model training 916, for example to generate a feature set, and the joint probability of correlation 904 is determined when matching engine 106 uses ensemble ML model to apply the feature set to the CC-MLO image pair 900, 902 and the results data 912, 914. In embodiments, process flow 906 may further include a correlation evaluator, such as correlation evaluator 122 of FIG. 1. The correlation evaluator, as a component of matching engine 106, may receive data from one or more of geo-matching ML model 118, similarity matching ML model 116, and ensemble ML model 120 and the correlation evaluator may generate and output the joint probability of correlation 904.

Figure 10:
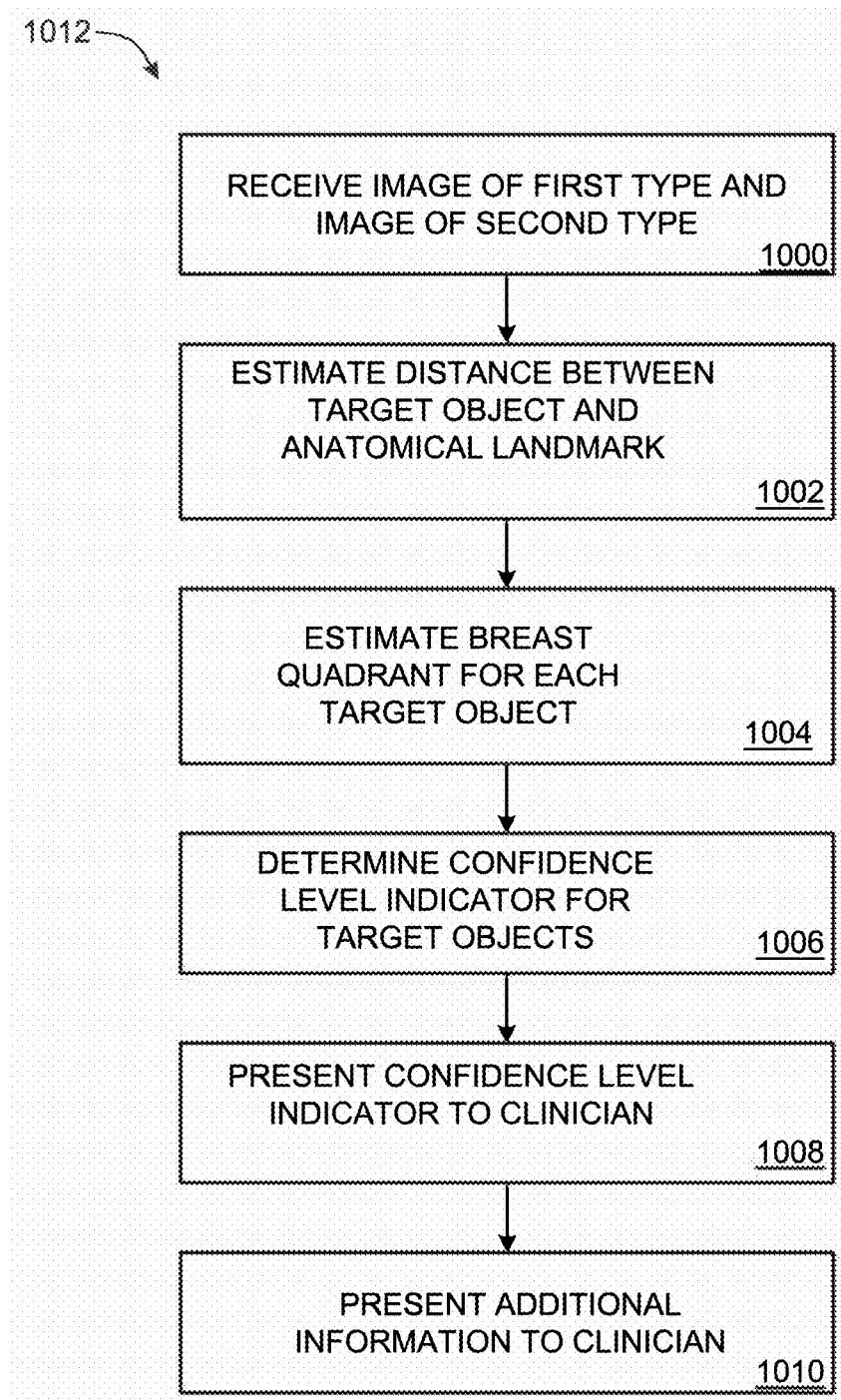
FIG. 10 illustrates a flowchart of a method of correlating a first lesion in a CC image to a second lesion in an MLO image.

FIG. 10 illustrates a flowchart of a method 1012 of correlating a first lesion in a CC image to a second lesion in an MLO image. The method is performed by a matching engine, such as matching engine 106 in FIGS. 1 and 9, using a geo-matching ML model, such as the geo-matching ML model 118 in FIGS. 1 and 9. Initially, as shown in block 1000, an image pair that consists of a first image of a first image type and a second image of a second image type is received. In one embodiment, the first and second image types are a CC image and an MLO image. The geo-matching matching model is used to estimate a first distance between at least one anatomical landmark and a first lesion in the CC image and a second distance between the at least one anatomical landmark and a second lesion in the MLO image (block 1002). The geo-matching ML model is also used to estimate in which quadrant of the breast the first and second lesions in the CC image and in the MLO image are located (block 1004).

The data from the distance determination and the quadrant determination are combined. In embodiments, geo-matching ML model is used to perform both a distance estimation to an anatomical landmark and a quadrant assignment, while in other embodiments, geo-matching ML model may be used to perform only one or the other method of evaluation, or another location- or geometry-based evaluation of a lesion's placement within a breast or other imaged volume.

In embodiments, each image of an image pair is individually evaluated as a whole using the geo-matching model. For example, each of a CC image and an MLO image in an image pair may be fully evaluated using the geo-matching ML model to identify lesions and estimate the locations of the lesions before the geo-matching ML model is used to determine whether a correlation exists between a first lesion identified in the CC image and a second lesion identified in the MLO image. One or more first lesions identified in the CC image and one or more second lesions may be identified in the MLO image. One or more correlations may be determined to exists between the first and second lesions in the CC image and the MLO image. For example, two first lesions may be identified in the CC image, first lesion (a) and first lesion (b), and two second lesions in the MLO image, second lesion (a) and second lesion (b). A first correlation may be determined to exist between first lesion (a) and second lesion (a), and a second correlation may be determined to exists between first lesion (b) and second lesion (b).

The geo-matching ML model is used to compute a confidence level indicator at block 1006. As described earlier, the confidence level indicator represents a probability that the first lesion in an image of the first image type (e.g., the CC image) is a same object as the second lesion in an image of the second image type (e.g., the MLO image). In some instances, the radiologist is interested in understanding the determination of the confidence level based on the geo-matching model alone. The confidence level indicator may be then presented to a radiologist at block 1008. In one embodiment, the confidence level indicator is displayed to the radiologist on a display device. In examples, a letter or other symbol indicia may be displayed to mark each of the first lesion in the CC image and the second lesion in the MLO image. If multiple regions of interest appear in the image pair, multiple letters or labels may be used. In embodiments, the letter or other symbol indicia is displayed without the confidence level indicator.

Next, as shown in optional block 1010, additional information is presented to the radiologist. The additional information may include, but is not limited to, an explanation as to why the matching engine derived the confidence level indictor presented or the reasoning why this CC-MLO pair has a higher (or lower) confidence level indicator. For example, measurement or other distance data and identification of the anatomical landmark used is displayed. An anatomical quadrant map may be displayed with the first or second lesion's orientation in a particular quadrant of each image type overlayed on the anatomical quadrant map. Sources of uncertainty may be identified on the display, such as indicating a lesion is lying on a quadrant boundary or indicating an inconsistency between the first lesion's relationship to a particular anatomical landmark and the second lesions relationship to the particular anatomical landmark.

Figure 11:
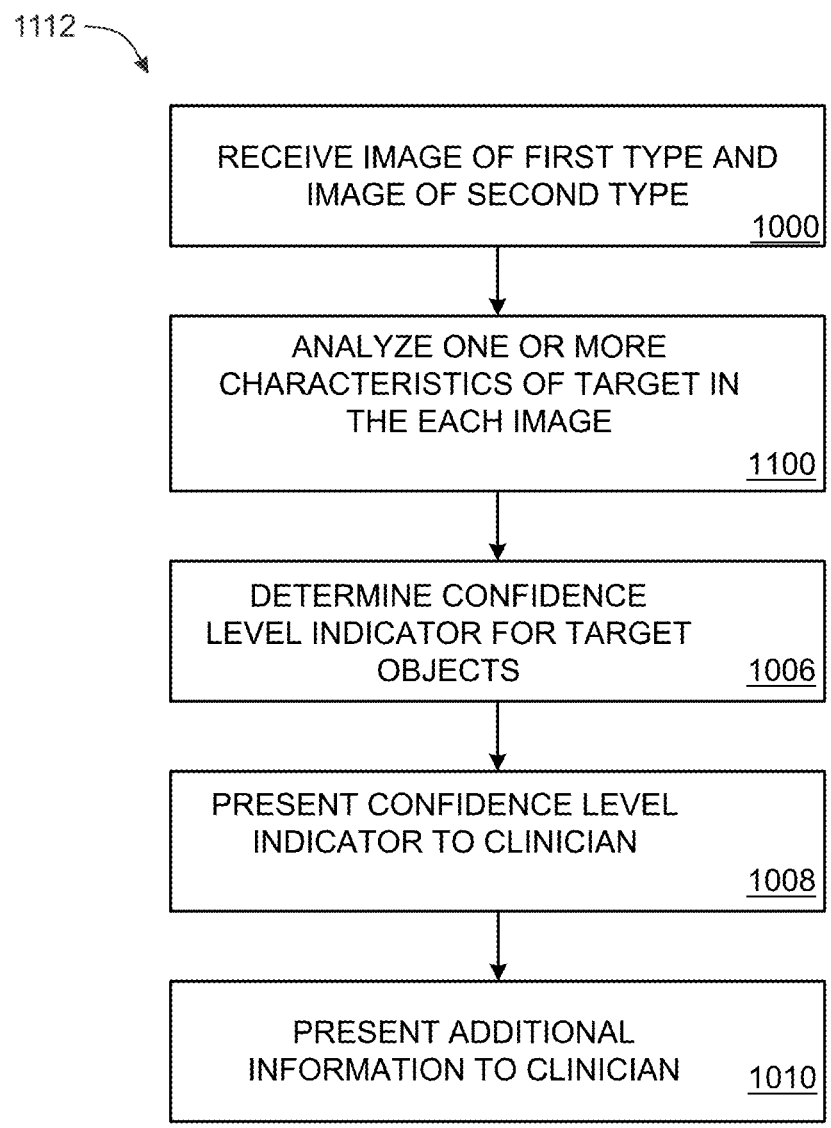
FIG. 11 illustrates a flowchart of another method of correlating a first lesion in a CC image to a second lesion in an MLO image.

FIG. 11 illustrates a flowchart of a method 1112 of correlating a first lesion in a CC image to a second lesion in an MLO image. The method is performed by a matching engine, such as matching engine 106 in FIGS. 1 and 9, using a similarity matching ML model, such as the similarity matching ML model 116 in FIGS. 1 and 9. The illustrated method 1112 shares some similar steps with the method 1012 shown in FIG. 10.

The CC and MLO images are received by the matching engine at block 1000. One or more characteristics of a first lesion in the CC image and a second lesion in the MLO image are determined at block 1100 using the similarity matching ML model. The characteristics assigned to a lesion include, but are not limited to, the size, the shape, the margins, the location, the density, the color, the orientation, the texture, the pattern, or the depth within the breast.

In embodiments, each image of an image pair is individually evaluated as a whole. For example, each of a CC image and an MLO image in a pair is fully evaluated using the similarity matching ML model to identify lesions or potential lesion and fully characterize the identified lesions before the similarity matching ML model is used to determine whether a correlation exists between a first lesion in the CC image and a second lesion in the MLO image. Like the geo-matching ML model, the similarity matching ML model may be used to identify and correlate one or more lesions in the image pair.

The similarity matching ML model is used to compute a confidence level indicator at block 1006. As described earlier, the confidence level indicator represents a probability that the first lesion in an image of the first image type (e.g., the CC image) is a same lesion as the second lesion in an image of the second image type (e.g., the MLO image). In some instances, the radiologist is interested in understanding the determination of the confidence level based on the similarity matching ML model alone. The confidence level indicator may be then presented to a radiologist at block 1008. In one embodiment, the confidence level indicator is displayed to the radiologist on a display device. In examples, a letter or other symbol indicia pair may be displayed to mark each of the first lesion in the CC image and the second lesion in the MLO image. If multiple regions of interest appear in the image pair, multiple letters or labels may be used. In embodiments, the letter or other symbol indicia is displayed without the confidence level indicator.

Next, as shown in optional block 1010, additional information is presented to the radiologist. The additional information may include, but is not limited to, an explanation as to why the matching engine derived the confidence level indictor presented or the reasoning why a particular CC-MLO pair has a higher (or lower) confidence level indicator. For example, shape, texture, orientation, or other characteristic data is displayed. One or more overlays may be presented over each of the first and second lesions, indicating, for example, shape or margin boundaries and indicating similarities or differences between the characteristics of the first and second lesion.

Figure 12:
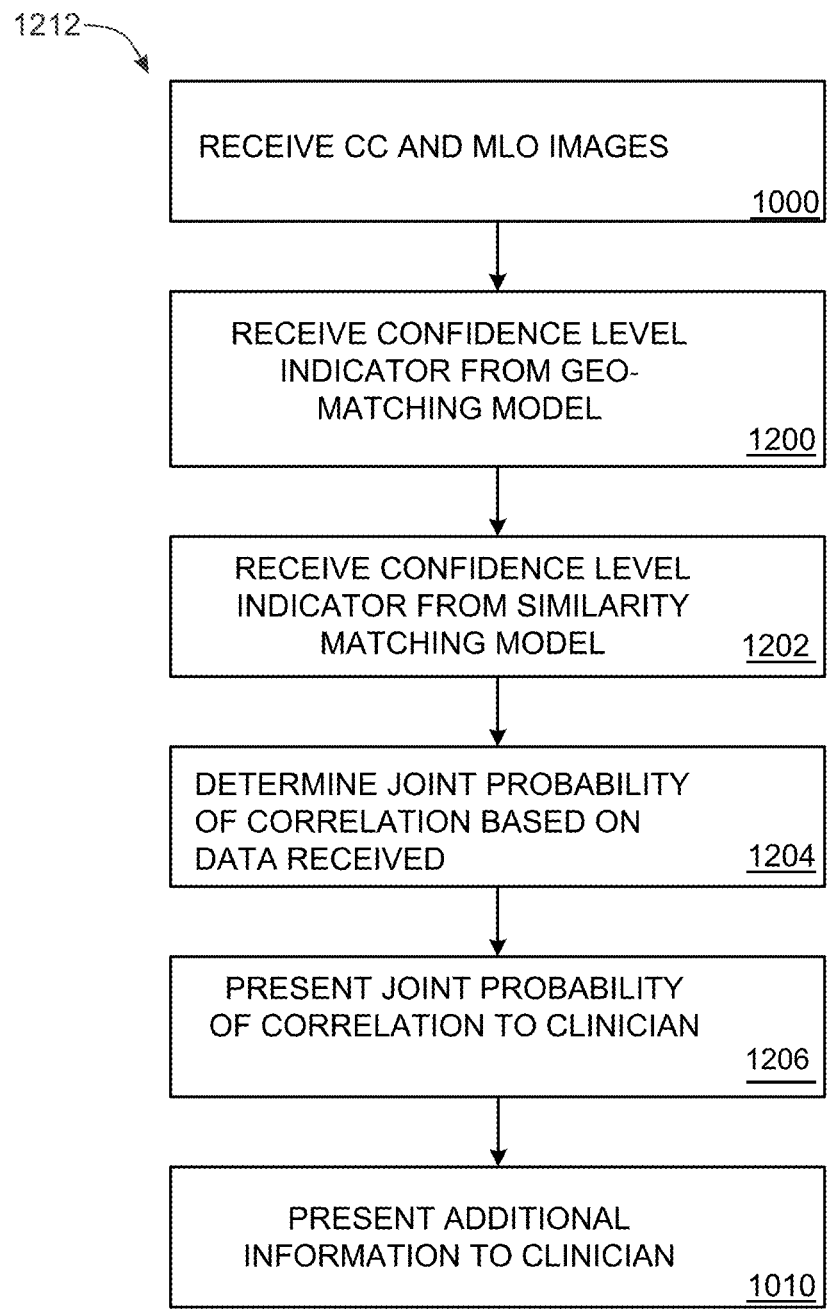
FIG. 12 illustrates a flowchart of an ensemble method of correlating a first lesion in a CC image to a second lesion in an MLO image.

FIG. 12 illustrates a flowchart of a method 1212 of correlating a first lesion in a CC image to a second lesion in an MLO image. The method 1212 is performed by a matching engine, such as matching engine 106 in FIGS. 1 and 9, using an ensemble matching ML model, such as the ensemble matching ML model 120 in FIGS. 1 and 9. In embodiments, some or all of the method 1212 may be performed by a correlation evaluator, such as correlation evaluator 122 in FIG. 1. The illustrated method 1212 shares some steps with the methods 1012, 1112 shown in FIGS. 10 and 11.

The CC and MLO images are received at block 1000. At block 1200, the confidence level indicator produced using the geo-matching ML model is received. In some cases, the distances between each of the first and second lesions and one or more anatomical landmarks for each of the CC and the MLO images, or an estimated quadrant for each of the first and second lesions in the CC and the MLO images, or other additional data are also received. At block 1202, the confidence level indicator produced using the similarity matching ML model is received. In embodiments, one or more characteristics of the first and second lesions in the CC and the MLO images, or other additional data are also received.

The ensemble matching ML model is used to analyze the CC and the MLO images, the confidence level indicators provided from each of the geo-matching ML model and the similarity matching ML model, and, in some embodiments, the any additional data received from one or both of the geo-matching and similarity matching ML models. Based on the analysis using the ensemble matching ML model, the matching engine generates a joint probability of correlation at 1204.

Part of the analysis may include emphasizing the data received from one type of model over another model or associating a greater or lesser weight with data received from a particular model. For example, based on a type of lesion the first and second lesions are identified to be (e.g., soft tissue lesions or clusters of calcifications), the ensemble matching ML model may determine, based on its training or previous analyses, that the data from either of the similarity matching ML model and the geo-matching ML model is more accurate in predicting the probability that the target lesions correlate to each other (and vice versa).

Additionally or alternatively, if the confidence level indicator produced by one model is relatively high while the confidence level indicator received from the other model is relatively low, the ensemble matching ML model may rely on the data received from the model that provided the relatively higher confidence level indictor (or vice versa). For example, for dense breasts the similarly matching ML model may result in a relatively low confidence level indicator due to obscuration of a lesion by the density of the surrounding tissue, while the geo-matching location ML model is able to compensate for the low confidence level indicator from the similarity matching ML model by providing a relatively high confidence level indicator indicating that the CC and MLO images are matching. Such adjustments may be indicated to the radiologist with a joint confidence level of correlation associated with the joint probability of correlation. In embodiments, such adjustments may be opaque to the radiologist but may be reflected in a relative weight assigned to one or both of the geo-matching ML and similarity matching ML model's contribution to the joint probability.

The joint probability of correlation may be then presented to a radiologist at block 1206. In one embodiment, the joint probability of correlation is displayed to the radiologist on a display device. The joint probability of correlation may also be used to determine other outputs to a display device. For example, a threshold may be associated with the joint probability of correlation such that if a user selects a lesion or ROI in a CC image and a joint probability of correlation exceeding a predetermined threshold is associated with that lesion or ROI, the system may automatically display a MLO image with the correlated lesion or ROI.

In examples, a letter or other symbol indicia may be displayed to mark each of the first lesion in the CC image and the second lesion in the MLO image. If multiple regions of interest appear in the image pair, multiple letters or labels may be used. In embodiments, the letter or other symbol indicia is displayed without the confidence level indicator.

Next, as shown in optional block 1010, additional information is presented to the radiologist. The additional information may include, but is not limited to, any of the additional information discussed above in relation to methods 1012, 1112.

Figure 13:
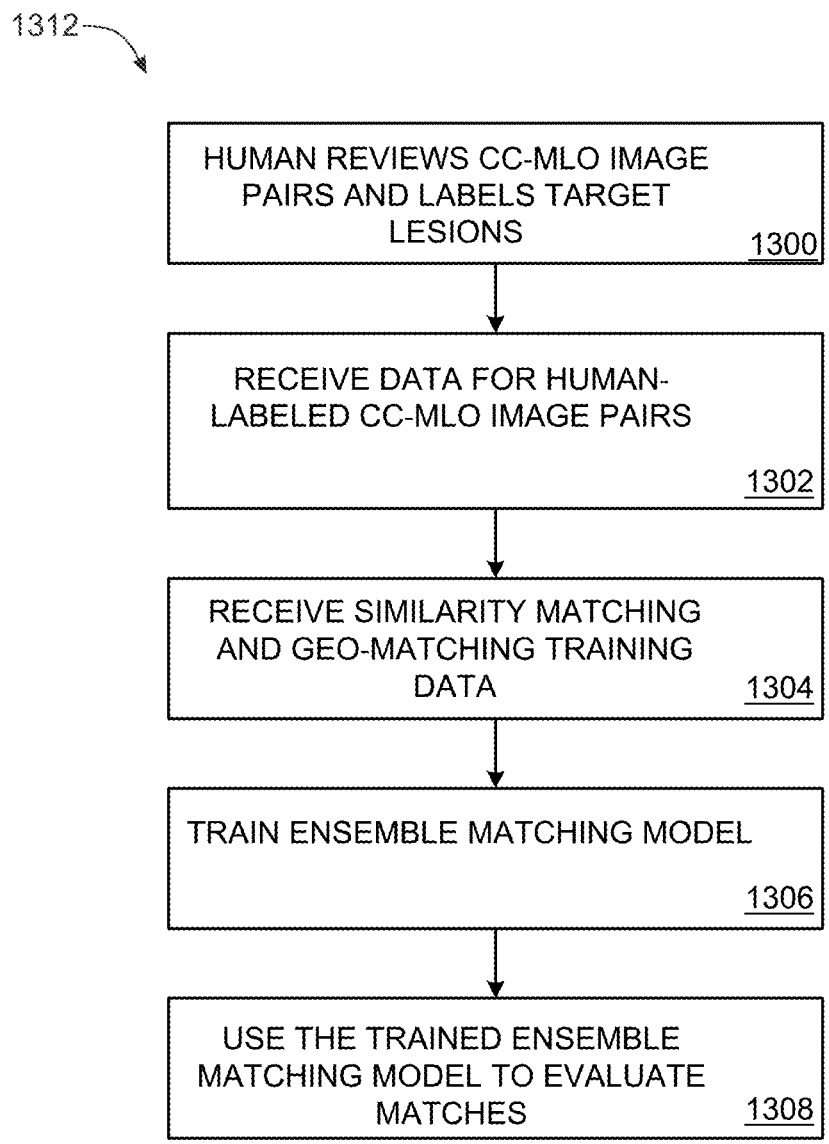
FIG. 13 illustrates a flowchart of a method of training an ensemble matching machine learning (ML) model.

FIG. 13 illustrates a flowchart of a method 1312 of training an ensemble matching ML model, such as ensemble matching ML model 120 of FIGS. 1 and 9. In one embodiment, the ensemble matching ML model is trained using a supervised training process. Initially, radiologists or a matching engine review multiple CC-MLO image pairs and label or otherwise identify a first and second lesions in the CC and MLO images that correlate to each other (block 1300). The labels can identify information for each of the first and second lesion pair, such as a type of lesion or whether or not the lesion is cancerous.

The labeled CC-MLO image pairs are input to the ensemble matching ML model at block 1302. Training data for the similarity matching ML model and for the geo-matching ML model are input to the ensemble matching ML model at block 1304. The ensemble matching ML model is trained using the human-labeled CC-MLO image pairs and the training data for the similarity and geo-matching ML models at block 1306. In embodiments, the ensemble matching ML model may generate a feature set based on the human-labeled CC-MLO image pairs and the training data for the similarity and geo-matching ML models. The trained ensemble matching ML model is then used, at block 1308, in a lesion identification and correlation system, such as the system 100 shown in FIG. 1.

In some embodiments, the similarity matching and the geo-matching ML models are trained using known training techniques. Additionally, the human-labeled CC-MLO image pairs are also used to train the similarity matching ML model and the geo-matching ML model. Each model can be trained independent of the other models. Alternatively, the geo-matching, similarity matching, and ensemble matching ML models may be trained in one step or training process.

Other embodiments can arrange the blocks in the flow-charts shown in FIGS. 10-13 in an order that is different from the illustrated order.

Figure 14:
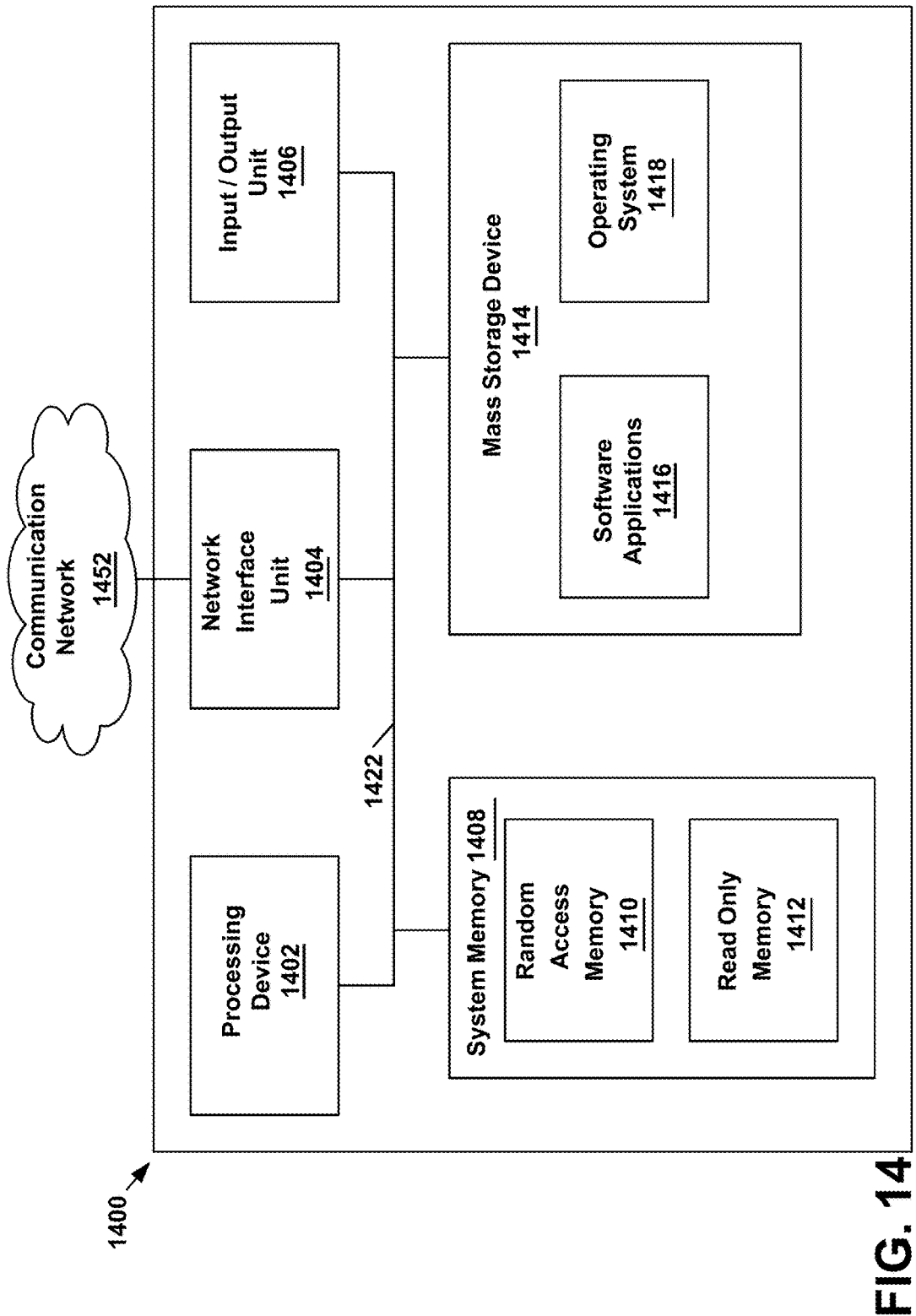
FIG. 14 illustrates a block diagram of example physical components of a computing system usable to implement one or more aspects of the present disclosure.

FIG. 14 is a block diagram illustrating example physical components of a computing device. The computing device 1400 can be any computing device utilized in conjunction with the identification system 100, such as the computing system 102, the x-ray computing device 112, and the computing system 110.

In the example shown in FIG. 14, the computing device 1400 includes at least one processing device (collectively processing device 1402), at least one memory (collectively memory 1408), and at least one bus (collectively bus 1422) that couples the memory 1408 to the processing device 1402. Example processing devices 1402 include, but are not limited to, a central processing unit, a microprocessor, an application specific integrated circuit, a digital signal processor, and a graphics processor. Example memory 408 includes a random-access memory ("RAM") 1410 and a read-only memory ("ROM") 1412. A basic input/output system that contains the basic routines that help to transfer information between elements within the computing device 1400, such as during startup, is stored in the ROM 1412.

The computing device 1400 further includes one or more storage devices (collectively storage device 1414). The storage device 1414 is able to store software instructions and data. For example, the storage device 1414 stores the GUI shown in FIG. 1.

The storage device 1414 is connected to the processing device 1402 through a storage controller (not shown) connected to the bus 1422. The storage device 1414 and its associated computer-readable storage media provide non-volatile, non-transitory data storage for the computing device 1400. Although the description of computer-readable storage media contained herein refers to a storage device, such as a hard disk or solid-state disk, it should be appreciated by those skilled in the art that computer-readable data storage media can include any available tangible, physical device or article of manufacture from which the processing device 1402 can read data and/or instructions. In certain examples, the computer-readable storage media includes entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 1400.

According to some examples, the computing device 1400 can operate in a networked environment using logical connections to remote network devices through a network 1452, such as a wireless network, the Internet, or another type of network. The computing device 1400 may connect to the network 1452 through a network interface unit 1404 connected to the bus 1422. It should be appreciated that the network interface unit 1404 may also be utilized to connect to other types of networks and remote computing systems.

The computing device 1400 also includes an input/output controller 1406 for receiving and processing input from a number of other devices, including a touch user interface display screen, or another type of input device. Similarly, the input/output controller 1406 may provide output to a touch user interface display screen or other type of output device.

As mentioned briefly above, the storage device 1414 and the RAM 1410 of the computing device 1400 can store software instructions and data. The software instructions include an operating system 1418 suitable for controlling the operation of the computing device 1400. The storage device 1414 and/or the RAM 1410 also store software instructions, that when executed by the processing device 1402, cause the computing device 1400 to provide the functionality discussed herein.

EXAMPLES

Illustrative examples of the systems and methods described herein are provided below. An embodiment of the system or method described herein may include any one or more, and any combination of, the clauses described below.

Clause 1. A method of correlating regions of interest (ROIs) in an image pair comprising a cranial-caudal (CC) image and a medial-lateral-oblique (MLO) image, the method comprising: receiving, by an ensemble matching machine learning (ML) model, data from a similarity matching ML model, the data from the similarity matching ML model including at least a matched pair of ROIs and a first confidence level indicator associated with the matched pair of ROIs; receiving, by the ensemble matching ML model, data from a geo-matching (GM) model, the data from the GM model including at least the matched pair of ROIs and a second confidence level indicator; determining, by the ensemble matching ML model, a joint probability of correlation based on evaluation of each of the first and second confidence level by the ensemble matching ML model, wherein the joint probability of correlation provides a probability that the ROI in the CC image correlates to the corresponding ROI in the MLO image and vice versa; and providing the joint probability of correlation to an output device.

Clause 2. The method of clause 1, further comprising: receiving data associated with training CC-MLO image pairs; and training the ensemble matching ML model with the data associated with the training CC-MLO image pairs.

Clause 3. The method of clause 1 or 2, further comprising determining, by the ensemble matching ML model, a third confidence level indicator based on evaluation of each of the first and second confidence level and the joint probability of correlation, wherein the third confidence level indicator is a likelihood of reliability associated with the joint probability of correlation.

Clause 4. The method of any of clauses 1-3, wherein the joint probability is a probability that the similarity correlation and the GM correlation properly correlated the CC-ROI and the MLO-ROI.

Clause 5. The method of any of clauses 1-4, wherein providing the joint probability of correlation to an output device comprises a numerical value associated with the joint probability of correlation.

Clause 6. The method of any of clauses 1-5, wherein each image of the matched lesion pair is a whole breast image.

Clause 7. The method of any of clauses 1-6, wherein each image of the matched lesion pair contains only the ROI for each of the CC image and the MLO image.

Clause 8. The method of any of clauses 1-7, wherein providing the joint probability of correlation to an output device comprises a numerical display.

Clause 9. The method of any of clauses 1-8, wherein providing the joint probability of correlation to an output device comprises: receiving a selection of the CC-ROI; and presenting, in response to receiving the selection of the CC-ROI, the MLO-ROI.

Clause 10. The method of clause 9, further comprising: determining, in response to receiving the selection of the CC-ROI, that the joint probably of correlation exceeds a predetermined threshold; and presenting, in response to determining that the joint probability of correlation exceeds a predetermined threshold, the MLO-ROI.

Clause 11. The method of any of clauses 1-10, wherein the matched pair of ROIs includes a similarity correlation between a CC-ROI in a CC-image and a MLO-ROI in a MLO image, wherein the first confidence level indicator is a probability associated with the correlation between the CC-ROI and the MLO-ROI.

Clause 12. The method of any of clauses 1-11, wherein the second confidence level indicator is a probability associated with a GM correlation between the CC-ROI and the MLO-ROI.

Clause 13. The method of any of clauses 1-12, further comprising: displaying, on the output display, a pair of symbols, wherein each symbol of the pair of symbols marks a ROI of the matched pair of ROIs.

Clause 14. The method of any of clauses 1-13, wherein the data from the GM model comprises location data for each ROI of the matched pair of ROIs.

Clause 15. The method of clause 14, wherein the second confidence level indicator indicates a probability that a first location of a first ROI of the matched pair of ROIs and a second location of a second ROI of the matched pair of ROIS are a same location.

Clause 16. The method of clause 14 or 15, wherein each of the CC image and the MLO image depicts a breast and the GM model logically divides the breast into quadrants.

Clause 17. The method of any of clauses 1-16, wherein the data from the similarity model comprises characteristics data for each ROI of the matched pair of ROIs.

Clause 18. The method of clause 17, wherein the first confidence level indicator indicates a degree of similarity between a first set of characteristics associated with a first ROI of the matched pair of ROI and a second set of characteristics associated with a second ROI of the matched pair of ROIs.

Clause 19. The method of clause 17 or 18, wherein the characteristics data includes one or more of a size, a shape, one or more margins, a location, a density, one or more colors, an orientation, a texture, a pattern, and a depth.

Clause 20. A system for ensemble matching a cranial-caudal (CC) and a medial-lateral-oblique (MLO) image comprising: at least one processor in communication with at least one memory; an ensemble matching module that executes on the at least one processor and during operation is configured to: receive, from a similarity matching model, a matched CC-MLO image pair and a similarity confidence level indicator associated with the matched CC-MLO image pair; receive, from a geometric matching (GM) model, the matched CC-MLO image pair and a GM confidence level indicator associated with the matched CC-MLO image pair; apply an ensemble matching model to determine an ensemble confidence level based on an ensemble machine learning (ML) algorithm trained on a plurality of matched CC-MLO pairs; associate the ensemble confidence level with the matched CC-MLO image pair; and output the ensemble confidence level with the matched CC-MLO image pair.

Clause 21. The system of clause 20, further comprising an image acquisition module.

Clause 22. The system of clause 20 or 21, wherein the matched CC-MLO image pair comprises a first region of interest (ROI) identified in the CC image and a second ROI identified in the MLO image, wherein either of the similarity ML model or the GM model assigns a correlation to the first ROI and the second ROI.

Clause 23. The system of clause 22, wherein the ensemble matching module further receives, from the GM model, location data associated with the correlation between the first ROI and the second ROI.

Clause 24. The system of clause 22 or 23, wherein the ensemble matching module further receives, from the similarity ML model, shape data associated with the correlation between the first ROI and the second ROI.

Clause 25. The system of any of clause 22-24, wherein the ensemble matching module further receives, from the similarity ML model, margin data associated with the correlation between the first ROI and the second ROI.

Clause 26. The system of any of clause 22-25, wherein the similarity matching model determines the matched CC-MLO image pair by: identifying a CC region of interest (ROI) in a CC-image received from an image acquisition module; searching an MLO image received from the image acquisition module for a MLO-ROI, wherein the MLO image includes plurality of regions and the similarity matching model review each region of the plurality of regions; determining at least one similarity characteristic of each of the CC-ROI and the MLO-ROI; and correlating the CC-ROI and the MLO-ROI based on the at least one similarity characteristic.

Clause 27. A method for ensemble matching a cranial-caudal (CC) image and a medial-lateral-oblique (MLO) image comprising: training an ensemble matching model using training CC-MLO image pairs, wherein the training CC-MLO image pairs include pairs of CC-MLO images with regions of interest (ROIs) correlated with high confidence and pairs of CC-MLO images with falsely correlated ROIs; determining, by the ensemble matching model, an ensemble confidence level for a correlation between ROIs in one or more paired CC-MLO images by: receiving a matched CC-MLO pair from a similarity matching model, the matched CC-MLO pair including a similarity confidence score; receiving the matched CC-MLO pair from a geo-matching model, the matched CC-MLO pair including a location confidence score; analyzing the matched CC-MLO pair along with the similarity confidence score and the location confidence score based on the training CC-MLO image pairs; calculating the ensemble confidence level; and generating an output presentation of the ensemble confidence level.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although various embodiments and examples are described herein, those of ordinary skill in the art will understand that many modifications may be made thereto within the scope of the present disclosure. Therefore, the specific structure, acts, or media are disclosed only as illustrative examples. Examples according to the technology may also combine elements or components of those that are disclosed in general but not expressly exemplified in combination, unless otherwise stated herein. Accordingly, it is not intended that the scope of the disclosure in any way be limited by the examples provided.

What is claimed is:

1. A method of correlating regions of interest (ROIs) in an image pair comprising a cranial-caudal (CC) image and a medial-lateral-oblique (MLO) image, the method comprising:
receiving, by an ensemble matching machine learning (ML) model trained using a first training set of matched CC-MLO image pairs, data from a first analysis of the image pair by a similarity matching ML model trained using a second training set of matched CC-MLO image pairs, the data from the similarity matching ML model including at least a matched pair of ROIs and a first confidence level indicator associated with the matched pair of ROIs;
receiving, by the ensemble matching ML model in parallel with receiving the data from the similarity matching ML model, data from a second analysis of the image pair by a geo-matching (GM) model trained using a third training set of matched CC-MLO image pairs, the data from the GM model including at least the matched pair of ROIs and a second confidence level indicator;
determining, by the ensemble matching ML model, a joint probability of correlation based on evaluation of each of the first and second confidence level by the ensemble matching ML model, wherein the joint probability of correlation provides a probability that the ROI in the CC image (CC-ROI) correlates to the corresponding ROI in the MLO image (MLO-ROI) and vice versa; and
providing the joint probability of correlation to an output device.

2. The method of claim 1, further comprising:
receiving data associated with training CC-MLO image pairs; and
training the ensemble matching ML model with the data associated with the training CC-MLO image pairs.

3. The method of claim 1, further comprising determining, by the ensemble matching ML model, a third confidence level indicator based on evaluation of each of the first and second confidence level and the joint probability of correlation, wherein the third confidence level indicator is a likelihood of reliability associated with the joint probability of correlation.

4. The method of claim 1, wherein the joint probability of correlation is a probability that the matched pair of ROIs in the data from the similarity matching ML model and the matched pair of ROIs in the data from the GM matching ML model properly correlated the CC-ROI and the MLO-ROI.

5. The method of claim 1, wherein providing the joint probability of correlation to an output device comprises a numerical value associated with the joint probability of correlation.

6. The method of claim 1, wherein each image of the matched pair of ROIs is a whole breast image.

7. The method of claim 1, wherein each image of the matched pair of ROIs contains only the ROI for each of the CC image and the MLO image.

8. The method of claim 1, wherein providing the joint probability of correlation to an output device comprises a numerical display.

9. The method of claim 1, wherein providing the joint probability of correlation to an output device comprises:
receiving a selection of the CC-ROI; and
presenting, in response to receiving the selection of the CC-ROI, the MLO-ROI.

10. The method of claim 1, wherein the matched pair of ROIs includes a similarity correlation between a CC-ROI in a CC-image and a MLO-ROI in a MLO image, wherein the first confidence level indicator is a probability associated with the similarity correlation between the CC-ROI and the MLO-ROI.

11. The method of claim 1, wherein the second confidence level indicator is a probability associated with a GM correlation between the CC-ROI and the MLO-ROI.

12. The method of claim 1, further comprising:
displaying, on the output device display, a pair of symbols, wherein each symbol of the pair of symbols marks a ROI of the matched pair of ROIs.

13. The method of claim 1, wherein the data from the GM model comprises location data for each ROI of the matched pair of ROIs.

14. The method of claim 1, wherein the data from the similarity matching ML model comprises characteristics data for each ROI of the matched pair of ROIs.

15. The method of claim 1, wherein the second and third training set of matched CC-MLO image pairs are a same training set of CC-MLO image pairs.

16. The method of claim 15, wherein each of the first, second, and third training set of matched CC-MLO image pairs are a same training set of CC-MLO image pairs.

17. The method of claim 1, wherein each of the first, second, and third training set of matched CC-MLO image pairs are a unique training set of CC-MLO image pairs.

18. A system for ensemble matching a cranial-caudal (CC) and a medial-lateral-oblique (MLO) image comprising:
at least one processor in communication with at least one memory;
an ensemble matching module that executes on the at least one processor and during operation is configured to:
receive, from a similarity matching model trained using a first training set of matched CC-MLO image pairs, a matched CC-MLO image pair and a similarity confidence level indicator associated with the matched CC-MLO image pair;
receive, from a geometric matching (GM) model trained using a second training set of matched CC-MLO image pairs, the matched CC-MLO image pair and a GM confidence level indicator associated with the matched CC-MLO image pair in parallel with the matched CC-MLO image pair received from the similarity matching model and the similarity confidence level indicator;

determine an ensemble confidence level based on each of the similarity confidence level indicator and the GM confidence level indicator, using an ensemble machine learning (ML) algorithm trained on a plurality of matched CC-MLO pairs;

associate the ensemble confidence level with the matched CC-MLO image pair; and output the ensemble confidence level with the matched CC-MLO image pair.

19. The system of claim 18, wherein the matched CC-MLO image pair comprises a first region of interest (ROI) identified in the CC image and a second ROI identified in the MLO image, wherein either of the similarity matching model or the GM model assigns a correlation to the first ROI and the second ROI.

20. The system of claim 19, wherein the ensemble matching module further receives, from the GM model, location data associated with the correlation between the first ROI and the second ROI.

21. The system of claim 19, wherein the ensemble matching module further receives, from the similarity matching model, shape data associated with the correlation between the first ROI and the second ROI.

22. The system of claim 19, wherein the ensemble matching module further receives, from the similarity matching model, margin data associated with the correlation between the first ROI and the second ROI.

23. The system of claim 19, wherein the similarity matching model determines the matched CC-MLO image pair by:

identifying a CC region of interest (ROI) in a CC-image received from an image acquisition module;

searching an MLO image received from the image acquisition module for a MLO-ROI, wherein the MLO image includes a plurality of regions and the similarity matching ML model reviews each region of the plurality of regions;

determining at least one similarity characteristic of each of the CC-ROI and the MLO-ROI; and correlating the CC-ROI and the MLO-ROI based on the at least one similarity characteristic.

\* \* \* \* \*